United States Patent
Ushiyama

(10) Patent No.: US 8,312,065 B2
(45) Date of Patent: Nov. 13, 2012

(54) TREE-TYPE BROADCAST SYSTEM, RECONNECTION PROCESS METHOD, NODE DEVICE, NODE PROCESS PROGRAM, SERVER DEVICE, AND SERVER PROCESS PROGRAM

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 613 days.

(21) Appl. No.: 12/222,584

(22) Filed: Aug. 12, 2008

(65) Prior Publication Data

US 2008/0319956 A1 Dec. 25, 2008

Related U.S. Application Data

(63) Continuation-in-part of application No. PCT/JP2007/055500, filed on Mar. 19, 2007.

(30) Foreign Application Priority Data

Apr. 11, 2006 (JP) .................................. 2006-109159

(51) Int. Cl.
*G06F 12/00* (2006.01)
*G06F 17/30* (2006.01)

(52) U.S. Cl. ........................................ 707/829; 707/622
(58) Field of Classification Search .................. 707/622, 707/829

See application file for complete search history.

(56) References Cited

U.S. PATENT DOCUMENTS

| | | | |
|---|---|---|---|
| 5,453,979 A | 9/1995 | Schibler et al. | |
| 5,805,824 A | 9/1998 | Kappe | |
| 6,993,587 B1 | 1/2006 | Basani et al. | |
| 6,996,678 B1 | 2/2006 | Sharma | |
| 7,251,670 B1 | 7/2007 | Day | |
| 7,321,939 B1 | 1/2008 | Porter | |
| 7,685,253 B1 | 3/2010 | Valia | |
| 7,739,239 B1 | 6/2010 | Cormie et al. | |

(Continued)

FOREIGN PATENT DOCUMENTS

EP 0 778 143 A1 6/1997

(Continued)

OTHER PUBLICATIONS

U.S. Appl. No. 12/232,597, in the name of Kentaro Ushiyama, filed Sep. 19, 2008.

(Continued)

*Primary Examiner* — Apu Mofiz
*Assistant Examiner* — Jared Bibbee
(74) *Attorney, Agent, or Firm* — Oliff & Berridge, PLC

(57) ABSTRACT

A node device in an information communication system including plural node devices mutually communicable through a network and are divided into plural groups,
the respective node devices having attribute information of the content data in the own node's charge among the content data corresponding to an own node's group among the content data acquirable by the information communication system, the node device including:
an address information memory means for memorizing address information of representative node devices in the respective groups;
a search request information sending means for sending search request information including search conditions for searching content catalog information to the representative node devices in the respective groups in accordance with the address information of the representative node device in the respective groups; and
a search result information receiving means for receiving search result information including the content catalog information returned from the representative node devices in the respective groups.

15 Claims, 26 Drawing Sheets

U.S. PATENT DOCUMENTS

| | | | |
|---|---|---|---|
| 7,783,777 B1 | 8/2010 | Pabla et al. | |
| 2002/0062336 A1 | 5/2002 | Teodosiu et al. | |
| 2002/0083118 A1 | 6/2002 | Sim | |
| 2002/0095454 A1 | 7/2002 | Reed et al. | |
| 2002/0114341 A1* | 8/2002 | Sutherland et al. | 370/428 |
| 2002/0120597 A1 | 8/2002 | Bae | |
| 2002/0141619 A1 | 10/2002 | Standridge et al. | |
| 2002/0143855 A1 | 10/2002 | Traversat et al. | |
| 2003/0018930 A1 | 1/2003 | Mora et al. | |
| 2003/0076837 A1 | 4/2003 | Whitehill et al. | |
| 2003/0126122 A1 | 7/2003 | Bosley et al. | |
| 2003/0140111 A1 | 7/2003 | Pace et al. | |
| 2003/0185233 A1 | 10/2003 | Ji et al. | |
| 2003/0188009 A1 | 10/2003 | Agarwalla et al. | |
| 2004/0044727 A1* | 3/2004 | Abdelaziz et al. | 709/203 |
| 2004/0104984 A1 | 6/2004 | Hall et al. | |
| 2004/0122741 A1* | 6/2004 | Sidman | 705/26 |
| 2004/0122903 A1 | 6/2004 | Saulpaugh et al. | |
| 2004/0181607 A1 | 9/2004 | Xu et al. | |
| 2004/0210624 A1 | 10/2004 | Andrzejak et al. | |
| 2004/0215622 A1 | 10/2004 | Dubnicki et al. | |
| 2005/0066219 A1 | 3/2005 | Hoffman et al. | |
| 2005/0080788 A1 | 4/2005 | Murata | |
| 2005/0122981 A1 | 6/2005 | Nabae | |
| 2005/0168540 A1 | 8/2005 | Wilson et al. | |
| 2005/0201405 A1 | 9/2005 | Liu et al. | |
| 2005/0223102 A1 | 10/2005 | Zhang et al. | |
| 2005/0243740 A1 | 11/2005 | Chen et al. | |
| 2006/0007865 A1 | 1/2006 | White et al. | |
| 2006/0023040 A1 | 2/2006 | Castle et al. | |
| 2006/0087532 A1 | 4/2006 | Takata et al. | |
| 2006/0167972 A1 | 7/2006 | Zombek et al. | |
| 2006/0173855 A1 | 8/2006 | Turner et al. | |
| 2006/0184667 A1 | 8/2006 | Clubb et al. | |
| 2006/0190243 A1 | 8/2006 | Barkai et al. | |
| 2006/0195532 A1 | 8/2006 | Zlateff et al. | |
| 2006/0218301 A1 | 9/2006 | O'Toole et al. | |
| 2007/0038950 A1 | 2/2007 | Taniguchi et al. | |
| 2007/0079004 A1* | 4/2007 | Tatemura et al. | 709/238 |
| 2007/0127503 A1 | 6/2007 | Zhao | |
| 2007/0230482 A1* | 10/2007 | Shim et al. | 370/400 |
| 2007/0288391 A1 | 12/2007 | Nakamura et al. | |
| 2008/0005334 A1* | 1/2008 | Utard et al. | 709/226 |
| 2008/0037536 A1 | 2/2008 | Padmanabhan et al. | |
| 2008/0130516 A1* | 6/2008 | You et al. | 370/254 |
| 2008/0319956 A1 | 12/2008 | Ushiyama | |
| 2009/0037445 A1 | 2/2009 | Ushiyama | |
| 2009/0052349 A1 | 2/2009 | Matsuo | |
| 2009/0103702 A1 | 4/2009 | Allen et al. | |
| 2009/0316687 A1 | 12/2009 | Kruppa | |

FOREIGN PATENT DOCUMENTS

| | | |
|---|---|---|
| EP | 1 583 326 A2 | 10/2005 |
| EP | 1 587 282 A2 | 10/2005 |
| JP | A-09-247159 | 9/1997 |
| JP | A-10-247909 | 9/1998 |
| JP | A-2000-358039 | 12/2000 |
| JP | A-2001-325140 | 11/2001 |
| JP | A-2002-318720 | 10/2002 |
| JP | A-2003-099337 | 4/2003 |
| JP | A-2003-216521 | 7/2003 |
| JP | A-2004-127074 | 4/2004 |
| JP | A-2004-524602 | 8/2004 |
| JP | A-2004-258994 | 9/2004 |
| JP | A-2004-533030 | 10/2004 |
| JP | A-2004-355114 | 12/2004 |
| JP | A-2004-362033 | 12/2004 |
| JP | A-2005-71227 | 3/2005 |
| JP | A-2005-353039 | 12/2005 |
| JP | A-2006-059133 | 3/2006 |
| JP | A-2006-244494 | 9/2006 |
| JP | A-2007-280303 | 10/2007 |
| JP | A-2007-280304 | 10/2007 |
| WO | WO 02/058453 A2 | 8/2002 |

OTHER PUBLICATIONS

U.S. Appl. No. 12/285,675, in the name of Hideki Matsuo, filed Oct. 10, 2008.

Japanese Office Action issued in Application No. 2006-110293; Mailed on Mar. 16, 2010 (With Translation).

Iwata et al., "P2P Gijutsu no Kiso Chishiki [1]," *UNIX Magazine*, Sep. 1, 2005, pp. 82-107, vol. 20, No. 9.

Zhao et al., "Tapestry: An Infrastructure for Fault-tolerant Wide-area Location and Routing," Report No. UCB/CSD-01-1141, Apr. 2001.

Rowstron, A. et al., "Pastry: Scalable, decentralized object location and routing for large-scale peer-to-peer systems", Proceedings of 18th IFIP/ACM International Conference on Distributed Systems Platforms (Middleware 2001). Heidelberg, Germany, Nov. 2001.

European Search Report issued in related European Application No. 07738960.9, mailed Nov. 11, 2009.

Uchida et al.; "AmorphicNet: Peer-to-Peer Distributed Information Sharing System with Dynamically Organized Index Servers"; Technical Report of IEICE; Aug. 16, 2002; pp. 1-6; vol. 102, No. 276 (with Abstract).

Takemoto et al.; "Load Balancing Schemes for Dynamic System Configuration in Content-Addressable Network"; Technical Report of IEICE; Jul. 29, 2003; pp. 13-18; vol. 103, No. 248 (with Abstract).

Office Action mailed Dec. 23, 2010 in U.S. Appl. No. 12/285,675.

Ramabhadran et al., "Prefix Hash Tree: an Indexing Data Structure Over Distributed Hash Tables," 2004.

Sato et al., "Dynamic Search Redirection in Adaptive P2P System," Proceedings Communications, Internet, and Information Technology, 2005.

Office Action mailed Mar. 10, 2011 in U.S. Appl. No. 12/232,597.

Jun. 7, 2011 Office Action issued in Japanese Patent Application No. 2006-109158, with translation.

Jun. 7, 2011 Office Action issued in Japanese Application No. 2006-109159 (with translation).

Jun. 24, 2011 Office Action issued in U.S. Appl. No. 12/285,675.

Yu Kaneko et al., "A Location-based Peer-to-Peer Network in a Ubiquitous Environment", Information Processing Society Paper Submission vol. 46 No. SIG18(TOD28)), Japan, Information Processing Society, Feb. 15, 2005, vol. 46, pp. 1-15.

Jun. 26, 2012 Office Action issued in Japanese Patent Application No. 2010-240413 (with English Translation).

\* cited by examiner

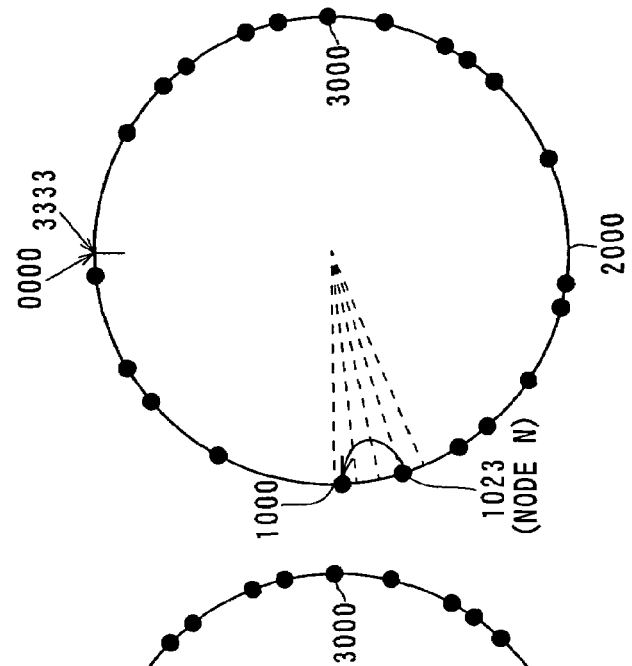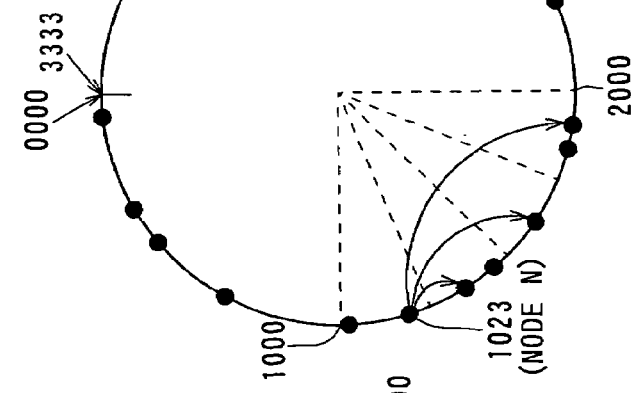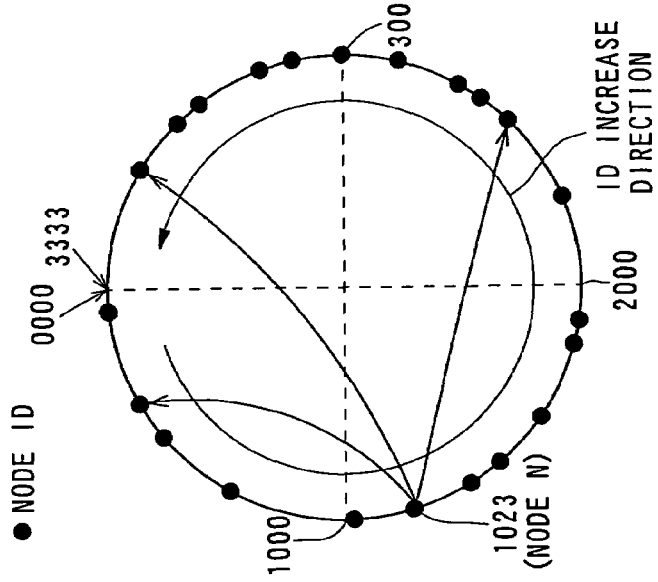

FIG. 3A

| 0130 | 1023 | 2203 | 3220 |
|---|---|---|---|
| IP ADDRESS 0 | — | IP ADDRESS 2 | IP ADDRESS 3 |

FIG. 3B

| 1023 | 1132 | 1202 | 1321 |
|---|---|---|---|
| — | IP ADDRESS 4 | IP ADDRESS 5 | IP ADDRESS 6 |

FIG. 3C

| 1000 | — | 1023 | — |
|---|---|---|---|
| IP ADDRESS 7 | — | — | — |

FIG. 3D

|  | EACH LEVEL ATTENTION DIGIT 0 | EACH LEVEL ATTENTION DIGIT 1 | EACH LEVEL ATTENTION DIGIT 2 | EACH LEVEL ATTENTION DIGIT 3 |
|---|---|---|---|---|
| LEVEL 1 | 0130 | 1023 | 2203 | 3220 |
|  | IP ADDRESS 0 | — | IP ADDRESS 2 | IP ADDRESS 3 |
| LEVEL 2 | 1023 | 1132 | 1202 | 1321 |
|  | — | IP ADDRESS 4 | IP ADDRESS 5 | IP ADDRESS 6 |
| LEVEL 3 | 1000 | — | 1023 | — |
|  | IP ADDRESS 7 | — | — | — |
| LEVEL 4 | — | — | — | 1023 |
|  | — | — | — | — |

FIG. 6

|  | EACH LEVEL ATTENTION DIGIT X=0 | EACH LEVEL ATTENTION DIGIT X=1 | EACH LEVEL ATTENTION DIGIT X=2 | EACH LEVEL ATTENTION DIGIT X=3 |
|---|---|---|---|---|
| LEVEL 1 X*** | 0132 NODE A | 1001 NODE B | 2120 NODE C | 3102 — |
| LEVEL 2 3X** | 3001 NODE D | 3102 — | 3232 NODE E | 3311 — |
| LEVEL 3 31X* | 3102 — | — | 3123 NODE G | 3130 NODE F |
| LEVEL 4 310X | — | — | 3102 — | 3103 NODE H |
|  | — | — | — | NODE I |

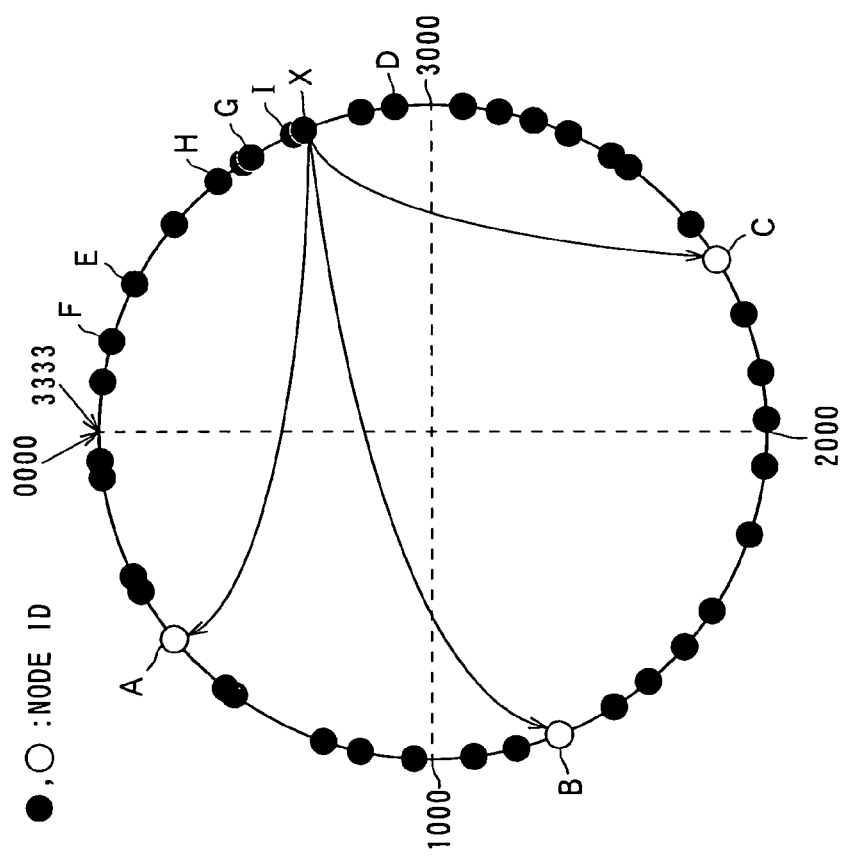
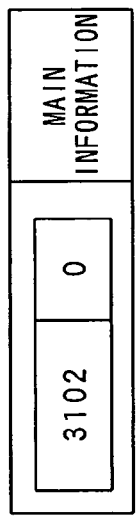
FIG. 8A
FIG. 8B

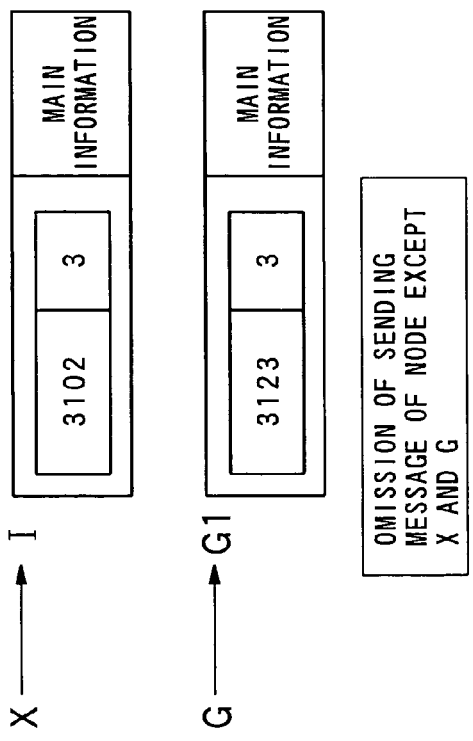
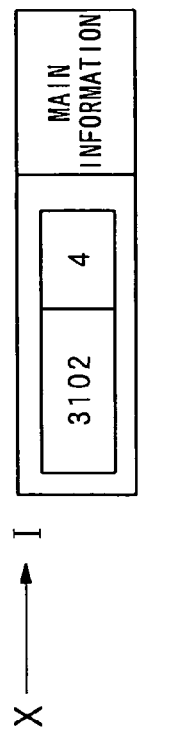
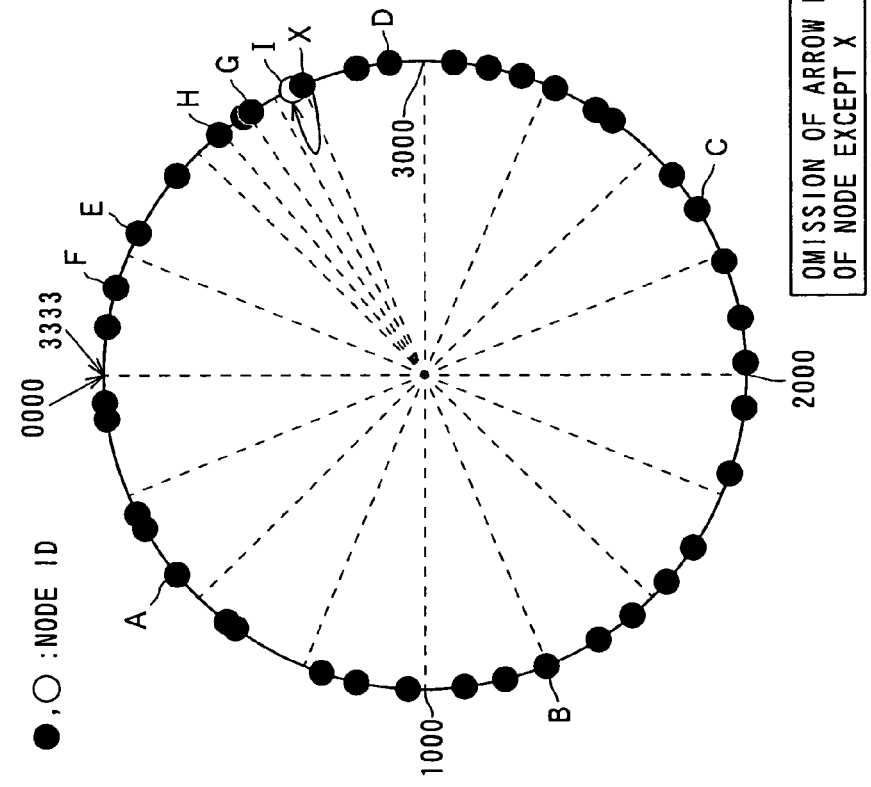

TREE-TYPE BROADCAST SYSTEM, RECONNECTION PROCESS METHOD, NODE DEVICE, NODE PROCESS PROGRAM, SERVER DEVICE, AND SERVER PROCESS PROGRAM

The entire disclosures of Japanese Patent Application No. 2006-109159 filed on Apr. 11, 2006 including the specification, claims, drawings and summary are incorporated herein by reference in its entirety.

BACKGROUND OF THE INVENTION

1. Field of the Invention

The present invention relates to a peer-to-peer (P2P) type communication system including a plurality of node devices mutually communicable through a network.

2. Discussion of Related Art

In this type of content delivery system, respective node devices have content catalog information, having attribute information (e.g. content name, genre, artist name) of content data in it, that are distributed to and stored in plural node devices, so that content data desired by users can be downloaded based on the attribute information, described in the content catalog information. Such the content catalog information is common information to be commonly used among plural node devices. Ordinarily the content catalog information is managed by a management server which manages all content data stored in the content delivery system and sent from the management server to the node devices in a response to a request of the node device.

For example, as this type of management server, Japanese Unexamined Patent Publication No. 2002-318720 discloses an index server that is located at the top of the hierarchy and manages all of the content information in the content delivery management system.

On the other hand, as a method of not using a management server, there are provided a pure P2P type delivery systems such as Gnutella, Freenet, and Winny. However, contents are searched by designating content names and keywords related to the content, location is identified and accessed. However, according to this method, users cannot use in such a way of viewing all content lists and access a desired content out of the lists, because there is no method of acquiring all lists of the content names.

SUMMARY OF THE INVENTION

Meanwhile, there is a problem where the data amount of the content catalog information is too big to be memorized in a unit of node when the number of contents entered in the content delivery system is big, and it is assumed that respective nodes cannot utilize all of the content catalog information.

For this reason, it is considered that the content catalog information is divided and stored in plural servers and node devices, and respective node devices acquire the content catalog information from the servers and the like that store necessary content catalog information and utilize it. Here, it is difficult for the respective node devices to search the content catalog information describing attribute information of desired content data.

The present invention is made in view of the above problem, and an object of the present invention is to provide a information communication system, a content catalog information search method, a node device and the like, wherein respective node devices can search desired content catalog information more efficiently in an information communication system enabling respective node devices to memorize content catalog information describing attribute information of the content data within a scope in charge of the respective node devices.

To solve the above problem, according to a first aspect of the present invention, there is provided a node device in an information communication system including a plurality of node devices which are mutually communicable through a network and are divided into a plurality of groups in conformity with a predetermined rule, the respective node devices being included in the information communication system of memorizing content catalogue information and having attribute information of the content data in the own node's charge among the content data corresponding to a group, to which the own node belongs, among the content data acquirable by the information communication system, the node device including:

an address information memory means for memorizing address information of representative node devices belonging to the respective groups;

a search request information sending means for sending search request information including search conditions for searching content catalog information, having the attribute information of desired content data described in it, to the representative node devices belonging to the respective groups, in accordance with the address information of the representative node device belonging to the respective groups; and a search result information receiving means for receiving search result information including the content catalog information returned from the representative node devices belonging to the respective groups.

According to the invention described in Claim 1, it is possible for each node device to more efficiently search desirable content catalogue information.

According to the present invention, respective node devices can make a search request more efficiently about content catalog information related to content data out of a scope where the own node is in charge in accordance with adder information of a representative node device, respectively belonging to respective groups that are memorized in an addressed information memory means.

BRIEF DESCRIPTION OF THE DRAWINGS

FIG. 2 is a view showing an example of state where a routing table is created.

FIG. 3 is a view showing an example of the rouging table.

FIG. 6 is an example of a routing table retained by a node X being a catalog management node.

FIG. 8 is a view showing a state where DHT multicast is carried out.

FIG. 11 is a view showing a state where DHT multicast is carried out.

DESCRIPTION OF THE PREFERRED EMBODIMENTS

Figure 1:
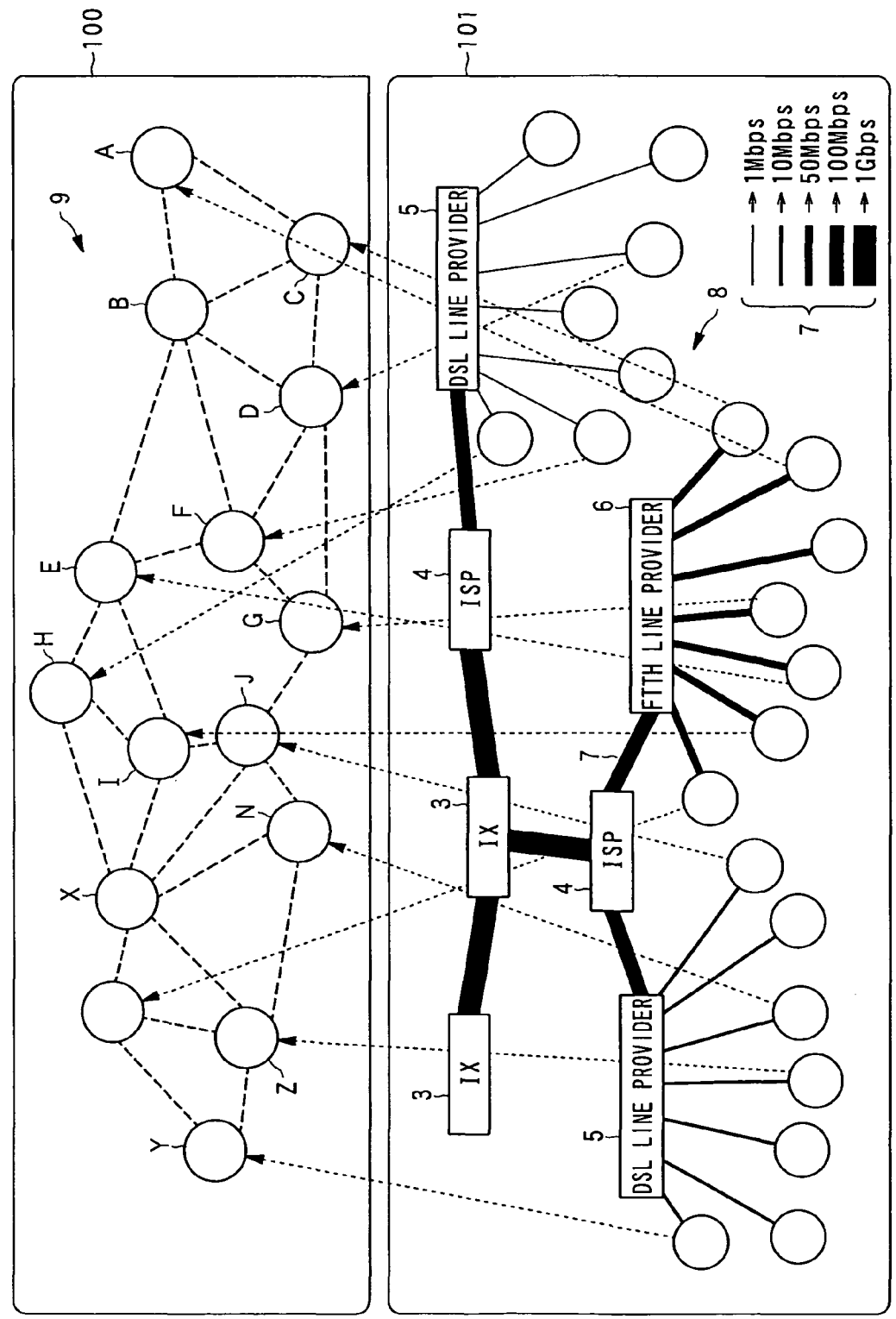
FIG. 1 is a view showing an example of connection status of respective node devices in a content delivery system related to the present embodiment.

Hereinafter, each designation of numerical reference in the drawings is typically as follows:
A to Z: Node;
8: Network;
9: Overlay network;
11: Control unit;
12: Memory unit;
13: Buffer memory;
14: Decoder;
15: Image processing unit;
16: Display unit;
17: Audio processing unit;
18: Speaker;
20: Communication unit;
21: Input unit;
22: Bus; and
S: Content delivery system.

Hereinafter, embodiments of the present invention will be described in reference of drawings. Here, the embodiments explained below are embodiments wherein the present invention is applied to a content delivery system using DHT (Distributed Hash Table).

1. Configuration and the Like of Content Delivery System

First, with reference to FIG. 1, schematic configuration and the like of a content delivery system is described as an example of information communication system.

FIG. 1 is a view showing an example of connection status of respective node devices in a content delivery system according to the present embodiment.

As shown in a lower frame 101 in FIG. 1, a network (network in the real world) 8 of the Internet or the like is structured by an internet exchange (IX) 3, internet service providers (ISP) 4, digital subscriber line (DSL) providers (or device thereof) 5, fiber to home line provider (or device thereof) 6, and communication line (e.g. a phone line or an optical cable) 7 and the like. Here, in the network (a communication network) 8 of the example of FIG. 1, a router for transferring messages (packets) is appropriately inserted but not shown in the figures.

The content delivery system S is provided with plural node devices (hereinafter referred to as "nodes") A, B, C, ... X, Y, Z ... that are mutually connected through such the network 8, and the system is a peer-to-peer type network system. Further, a unique manufacturing number and an IP (Internet Protocol) address as addressed information are allocated to each of the nodes A, B, C, ... X, Y, Z .... Such manufacturing numbers and IP addresses do not overlap among plural nodes.

Next, algorithm using a distributed hash table (hereinafter referred to as "DHT") related to the present embodiment is described.

In the above-mentioned content delivery system S, the nodes should know an IP address or the like with each other when the nodes exchange information with each other.

For example, in a system that shares contents each other, it is a simple method that respective nodes participating in the network 8 know IP addresses of all the nodes participating in the network 8. However, it is not realistic to memorize IP addresses of all the nodes when the number of terminals becomes numerous, tens of thousands or hundreds of thousands. Further, when arbitrary nodes turn on or turn off, operation becomes difficult because updating IP addresses of the arbitrary nodes memorized in the respective nodes becomes complicated.

Then, a system is devised wherein a unit of node memorizes only IP addresses of the necessary minimum nodes among all the nodes participating in the network 8, and information is mutually transferred and delivered among respective nodes with respect to a node of unknown (not memorized) IP address.

As an example of such the system, an overlay network 9 is configured by an algorithm using DHT as shown in an upper frame 100 of FIG. 1. That is, the overlay network 9 means a network configuring a virtual link formed by use of an existing network 8.

In the present embodiment, an overlay network 9 configured by an algorithm using DHT is premised, and nodes allocated to this overlay network 9 are referred to as nodes participating in the overlay network 9. Here, participation into the overlay network 9 is done when a node not yet participating sends a participation request to an arbitrary node already participating.

The respective nodes have a node ID as unique node identification information, and the node ID is a hash value, consisting of determined digit number, that is obtained by hashing, for example, IP addresses or manufacturing numbers with a common hash function (e.g. SHA-1), and nodes are distributed and allocated in one ID space without deviation. It is required for the node ID to have bit number enough to include maximum operation numbers of nodes. For example, when the number is a 128-bit number, the node can operate $2^{128}=340\times10^{36}$ nodes.

As described above, the node ID obtained by a common hash function has a very low possibility of having the same value if the IP address or the manufacturing number differs. Here, detailed explanation is omitted because the hash function is well known.

[1.1 Method of Creating DHT Routing Table]

Next, an example of a method of crating a routing table being content of DHT will be explained with reference to FIGS. 2 and 3.

FIG. 2 is a view showing an example of state where a routing table is created. FIG. 3 is a view showing an example of routing table.

Since the nodes ID provided to respective nodes are generated by a common hash function, they are considered to be dispersed and allocated in the same ring-shape ID space without much deviation as shown in FIGS. 2(A) to 2(C). The figures are provided with a node ID at 8 bits and illustrated. In the figures, a black dot indicates a node ID, and ID increases counterclockwise.

First, as shown in FIG. 2(A), the ID space is divided (split) into several areas (as groups) according to the predetermined rule. Although, actually, about 16-area division is often used, ID is expressed by quaternary number of bit length of 8 bits for easy explanation. Then a node ID of a node N is set up to be "1023" and an example of creating a routing table of this node N is explained.

(Routing of Level 1)

When the ID space is quadrisected, respective areas thus quadrisected have different maximum digit, "0XXX", "1XXX", "2XXX", and "3XXX" (X being integer number of 1 to 3, similar to the above hereinafter) when expressed by quaternary number. It is located in the area "1XXX" at the lower left of the figure because the node ID of the node N itself is "1023".

Then the node N arbitrarily selects respective nodes located in an area except for the area (i.e. area "1XXX") where the own exists (belonging to a group) as a representative node, and registers (memorizes) the IP address or the like of the node ID (actually, also inclusive of port number) (similar to the above hereinafter) in respective entries (table entries) of the table level 1. FIG. 3(A) is an example of the table level 1. Here, the IP address or the like is not necessary to be registered because an entry of the second column in the table level 1 indicates the node N itself.

(Routing of Level 2)

Next as shown in FIG. 2(B), the area where the own exists, among the areas thus quadrisected by the routing is further quadrisected into four areas "10XX", "11XX", "12XX", and "13XX" (that is, a group where the node N itself belongs is divided into further plural small groups).

Then in a manner similar to the above, respective nodes existing in an area except for the area where the own exists are arbitrarily selected, and an IP address or the like of the node ID is registered in respective entries (table entries) in a table level 2. FIG. 3(B) is an example of the table level 2. Here, since an entry of the first column of the table level 2 indicates the node N itself, it is unnecessary to register the IP address or the like.

(Routing of Level 3)

Next as shown in FIG. 2(C), the area where the own node exists among the areas thus quadrisected by the routing is further quadrisected into four areas "100×", "101×", "102×", and "103×" (that is, a small group where the node N itself belongs is divided into further plural small groups). Then, as in a manner similar to the above, respective nodes existing in an area except for the area where the own exists are arbitrarily selected as a representative node, and an IP address or the like of the node ID is registered in respective entries (table entries) in a table level 3. FIG. 3(C) is an example of the table level 3.

Here, since an entry of the third column of the table level 3 indicates the node N itself, the IP address or the like is not necessary to be registered. The entries of the second column and the fourth column are blank because no node exists in the area.

In such the way, a routing table created up to level 4 as shown in FIG. 3(D) enables to cover all 8-bit IDs. Blank entries in the table become outstanding as the level increases.

All the nodes respectively create and hold the routing table that is created in conformity with the above-mentioned methods (rules). (Although the routing table is created, for example, when a not-yet participant node participates in the overlay network 9, detailed explanation of creation of such the routing table is omitted because it is not directly associated with the present invention.)

Thus, the respective nodes memorize the IP address or the like as addressed information of the other nodes and the area of the node ID space as a group and a small group, in other words respective levels and respective columns of DHT in correspondence one another.

That is, the respective nodes relate the IP address or the like of a node one belonging to respective areas that are divided into plural groups to respective areas, and define them as a stage one (level one). Further, the area where the own belongs is further divided into plural areas, the IP address or the like of the node one belonging to thus divided respective areas is related to the respective areas, and the respective nodes memorize the routing table defined as the next stage (level).

Here, the number of levels is determined in correspondence with the digit number of the node ID, and an attention digit number of the respective levels in FIG. 3(D) is determined in response to the base number. Particularly, ID is 64 bits and the number of alpha-numeral of attention digits in level 16 is 0 to F in the case of 16 digits hexadecimal number. In explanation of the routing table described below, a portion indicating the number of attention digits in respective levels is also simply called "column".

[1.2 Method of Storing and Detecting Content Data]

Next, a method of storing and detecting acquirable content data in the content delivery system S is explained.

In the overlay network 9, various content data (e.g. movie, music, or the like) are distributed and saved (stored) in plural nodes (in other words, content data are copied and a replica being copy information are distributed and stored).

For example, content data of a movie having a title of XXX is stored in nodes A and B. Meanwhile, content data of a movie having a title of YYY is stored in nodes B and C. In such a manner, content data are distributed in plural nodes (hereinafter referred to as a "content retention node") and stored.

Further, to each of these content data, information such as a content name (title) and a content ID (content identification information unique to each content) are added. This content ID is generated by, for example, hashing content name+arbitrary numerical value (or upper some bytes of the content data) by the hash function commonly used to obtain the node ID (allocated in the same ID space as the node ID). Alternatively, a system operator may give a unique ID value (same bit length as a node ID) to each content. In this case, content catalog information mentioned below, where correspondence between a content name and a content ID is described is distributed to the respective nodes.

Further, location of the content data thus distributed and stored, in other words, the IP address or the like of the node storing the content data and the index information including a group of content ID or the like corresponding to the content data are memorized (in an index cache) and managed by a management source node (hereinafter referred to as a "root node" or a "root node of the content (content ID)" where the content data is located.

For example, index information regarding content data of the movie having a title of XXX is managed by a node M being a root node of the content (content ID), and index information regarding content data of the movie having a title of YYY is managed by a node O being a root node of the content (content ID).

In other words, load is distributed because the root nodes are divided with respect to each content. Moreover, even in a case where the same content data (same content ID) are stored in plural content retention nodes, index information of such content data can be managed by one root node. Moreover, such a root node is set up to be, for example, a node having a node ID closest to a content ID (e.g. upper digits match the most).

The node (content retention node) thus storing the content data generates a publish (registration notification) message including the content ID of the content data, the own IP address or the like (registration message indicative of a request for registering IP address or the like because the content data are stored) in order to notify to the root node that the content data are stored, and sends out the publish message to the root node thereof. Therefore, the publish message reaches the root node by DHT routing using a content ID as a key.

Figure 4:
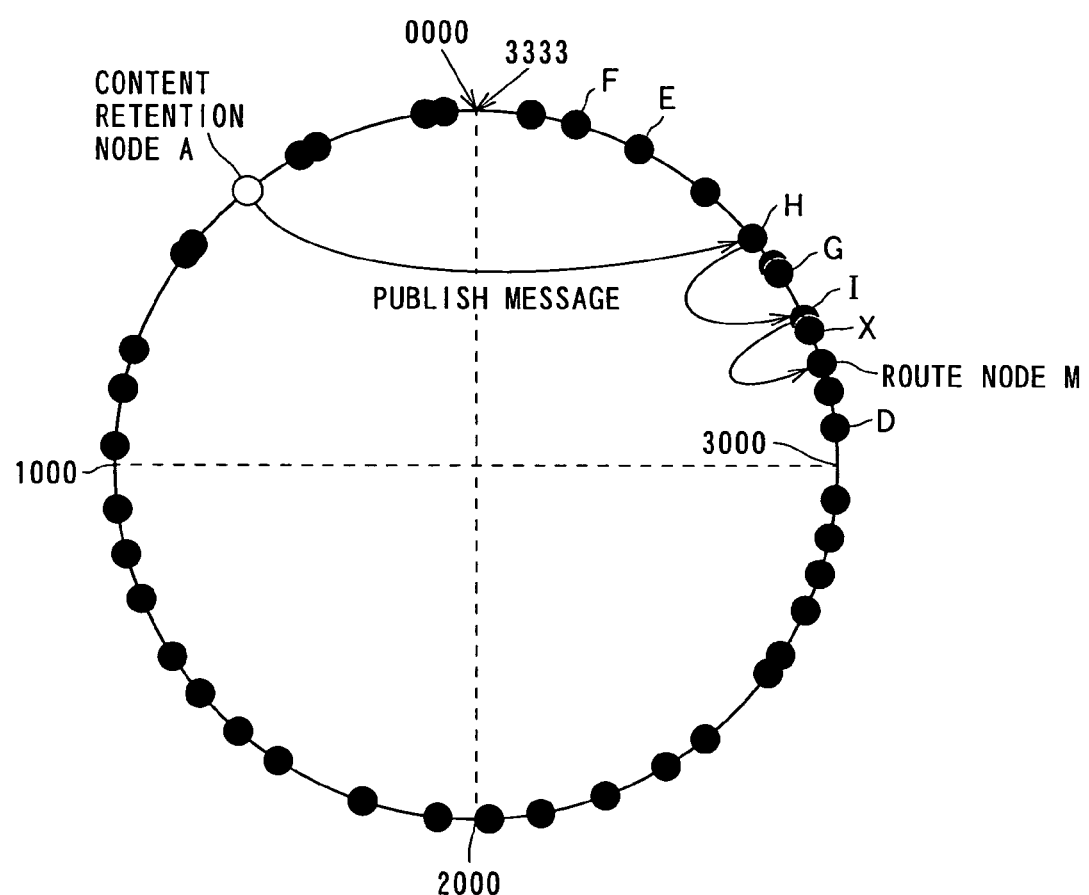
FIG. 4 is a schematic view showing an example of flow of a publish message sent out from a content retention node in a node ID space of DHT.

FIG. 4 is a schematic view showing an example of a flow of publish message sent from a content retention node in a node ID space of DHT.

In the example of FIG. 4, with reference to a table level 1 of the own DHT, for example, a node A being a content retention node acquires an IP address or the like of, for example, a node H having a node ID closest to a content ID included in the publish message (e.g. upper digits match the most), and sends the publish message to the IP address or the like.

Meanwhile, the node H receives the publish message refers to a table level 2 of the own DHT, acquires an IP address or the like of, for example, a node I having a node ID closest to a content ID included in the publish message (e.g. upper digits match the most), and transfers the publish message to the IP address or the like.

On the contrary thereto, the node I receives the publish message, refers to a table level 3 of the own DHT, acquires an IP address or the like included in transfer destination node information of, for example, a node M having a node ID closest to the content ID included in the publish message (e.g. upper digits match the most), and transfers the publish message to the IP address or the like.

Alternatively, the node M receives the publish message, refers to a table level 4 of the own DHT, recognizes that the node ID closet to the content ID included in the publish message (e.g. upper digits match the most) is own, in other words, the own node is the root node of the content ID, and registers (memorizes in the index cache region) the IP address or the like included in the publish message and index information including a group of content ID.

Here, the IP address or the like included in the publish message and the index information including the group of content ID is registered (cached) in a node (hereinafter referred to as "relay node"—node H and node I in the example of FIG. 4) on a transfer route from the content retention node to the root node (a relay node thus caching the index information referred to as a cache node).

In a case where a user of a given node desires to acquire the desired content data, the node desiring to acquire the content data (hereinafter referred to as "user node") sends out a content location inquiry message including the content ID of content data selected by the user from the content catalog information to the other nodes according to the routing table of the own DHT. Thus the content location inquiry message routes (is transferred) through several relay nodes by DHT routing using the content ID as a key and reaches the root node of the content ID in a manner similar to the above-mentioned publish message. The user node acquires (receives) index information of the above-mentioned content data from the root node and connects to the content retention node storing the content data based on the IP address or the like, so that it is possible to acquire (download) the content data from there. Here the user node may also acquire (receive) the IP address or the like from the relay node (cache node) caching the index information same as the root node.

[1.3 Content of Content Catalog Information]

Next, contents of the content catalog information, or the like is explained.

In content catalog information (also referred to as content list), attribute information of many content data which can be acquired by respective nodes in the content delivery system S is described in correspondence with respective content IDs. As this attribute information, there are, for example, content name (movie title in a case where content is movie; music title in case of music; program title in case of broadcast program), genre (action, horror, comedy, love story, etc. in case of movie; rock, jazz, pop, classical, etc. in case of music; drama, sport, news, movie, music, animation, variety show, etc. in case of broadcast program), artist name (singer, group, etc. in case of music), performer (cast in case of movie and broadcast program), director name (in case of movie), and others.

Such the attribute information is an element in a case where the user specifies the desired content data and used as a search keyword as search conditions for searching the desired content data from a lot of content data. For example, when the user inputs "jazz" as a search keyword, all content data applicable to "jazz" are searched in attribute information and attribute information (e.g. content name, genre) of thus searched content data is presented to enable the user to select.

Figure 5C:
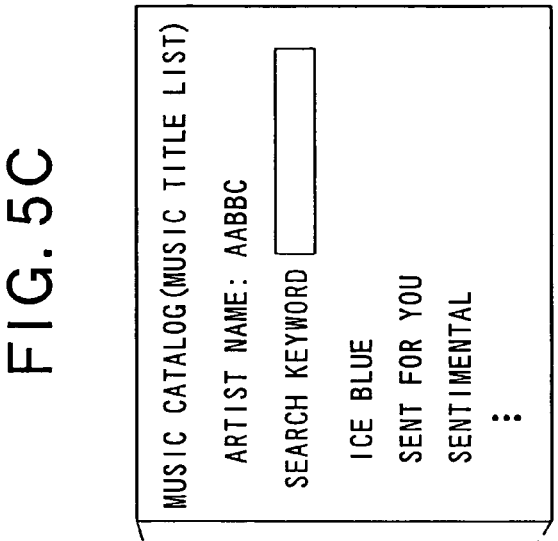
FIG. 5 is a schematic view showing an example of display form transition of a music catalog.
Figure 5B:
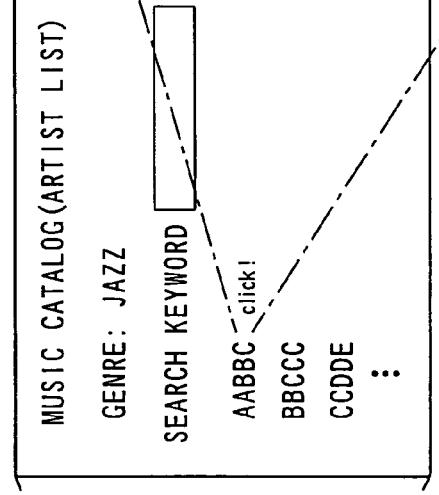
Figure 5A:
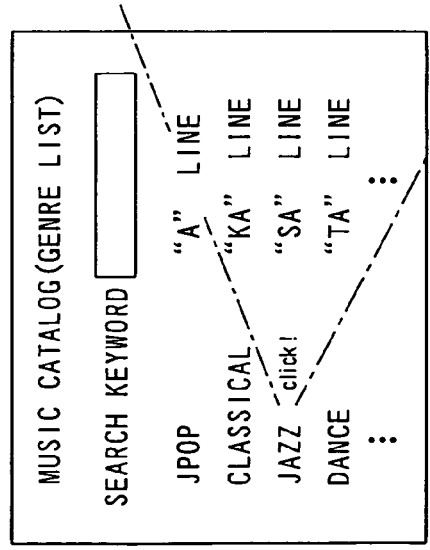

FIG. 5 is a schematic view showing an example of display form transition of a music catalog. Such a music catalog is just an example of the content catalog information of the present invention. In this example, when, for example, jazz is inputted and searched as a search keyword in a list of genres as shown in FIG. 5(A), a list of artist names applicable to the jazz is displayed as shown in FIG. 5(B), and then when, for example, an artist "AABBC" as a search keyword is inputted and searched in the list of artist names, a list of music titles applicable to the artist (for example, being sung by or performed by the artist) is displayed as sown in FIG. 5(C). Then, when the user selects a desired music title in such the list of music titles through an input unit, the content ID of the music data (an example of content data) is acquired, and a content location inquiry message including the content ID is sent toward the root node as mentioned above. Here, the content ID is not necessarily described in the content catalog information. In this case, respective nodes may hash content name+arbitrary number value included in the attribute information with a hashed common hash function which hashes the node ID to generate the content ID.

Then such the content catalog information is managed by the node managed by, for example, a system manager or the like (hereinafter referred to as "catalog management node") or a catalog management server. For example, a content data newly entered in the content delivery system S is stored in the node in the content delivery system S after receiving permission from this catalog management node (content data once entered are acquired from the content retention node and a replica thereof is stored as mentioned above). Then in a case where new content data are stored in the node in the content delivery system S, attribute information of the content data is newly registered in the content catalog information (serial numbers being added in order of registration), thereby updating (version upgrading) content catalog information. Further, when being deleted from the content delivery system S, the content data are permitted by the catalog management node, attribute information of the content data is deleted from the content catalog information, thereby updating the content catalog information (here, similarly, in a case where attribute information is partially changed, the content catalog information is updated).

Further, version information indicative of a version is added to entire content catalog information. This version information is expressed by, for example, a serial version number, and every time the content catalog information is updated (e.g. attribute information of the content data being newly registered), predetermined value (e.g. "1") of the serial number is counted up (here, new registration in the content catalog information may be carried out after a certain amount of content data to be registered is accumulated or every time new registration is requested).

Further, for example, a serial version number at the time of new registration is added to the respective content data (this is not counted up nor changed even though the entire content catalog information is updated) (For example, a serial version number "1" being added to content data of a serial number "100", and a serial version number "2" is added to content data of a serial number "200"). Therefore, it can be judged which content data is obtained at which time of version-up.

[1.4 Method of Delivering Content Catalog Information]

Next, with reference to FIGS. 6 to 11, a method of delivering content catalog information is explained.

Such the content catalog information can be delivered to all nodes participating in the overlay network 9 by, for example, multicast using the above-mentioned DHT (hereinafter referred to as "DHT multicast").

FIG. 6 is an example of routing table retaining the node X being a catalog management node. FIG. 7 is a schematic view showing a catalog delivery message. FIGS. 8 to 11 are views showing states where DHT multicast is carried out.

Here, the node X retains a routing table shown in FIG. 6, and the node ID (4 digits, quaternary number) and the IP address of any one of node A to node I are memorized in the entry corresponding to respective areas of levels 1 to 4 of the routing table.

Figure 7A:
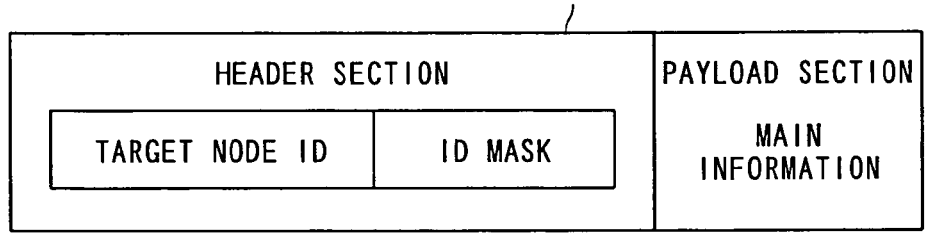
FIG. 7 is a schematic view showing a catalog delivery message.

Further, the catalog delivery message is configured by a packet including a header section and a payload section as shown in FIG. 7(A). The header section includes a target node ID, an ID mask as a group specifying value indicating levels, and the IP address (not shown) or the like of the node corresponding to a target node ID. The payload section includes a unique ID for identifying the message and main information having content catalog information.

Here, a relation between the target node ID and the ID mask is explained in detail.

The target node ID has the number of digits similar to that of the node ID (4 digits, quaternary number in the example of FIG. 6), sets up the node to be a sending destination target, makes the node ID of node sending or transferring, for example, the catalog delivery message in response to an ID mask value, and makes node ID of the node of sending destination.

Further, the ID mask designates the effective number of digits of the target node ID, and the node ID where effective number of digits is common in the higher digits in the target node ID is indicated based on the effective number of digits. Specifically, the ID mask (ID mask value) is an integral number of the maximum digit number or less of the node ID of 0 or more, and for example, in a case where the node ID is 4 digits quaternary number, the ID mask is an integral number from 0 to 4.

Figure 7B:
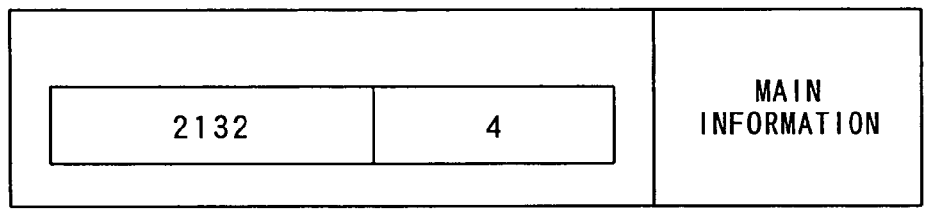

For example, as shown in FIG. 7(B), in the case of the target node ID of "2132" and the ID mask value of "4", all the target ID of "four" digits are effective, and only node ID of "2132" is a sending destination target of the catalog delivery message.

Figure 7C:
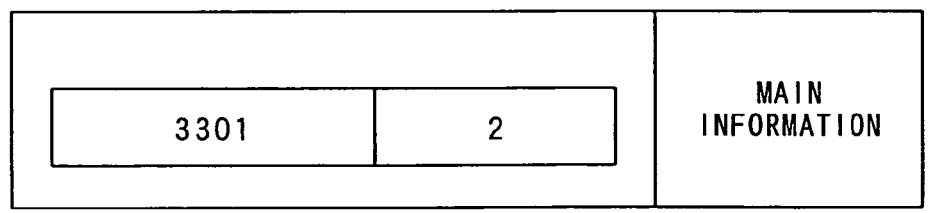

Further, as shown in FIG. 7(C), in the case of the target node ID of "3301" and the ID mask value of "2", higher "two" digits of the target node ID are effective (node ID is "33**")), and all the nodes on the routing table having higher two digits of "33" (lower two digits may be any value) become sending destination targets of the catalog delivery message.

Figure 7D:
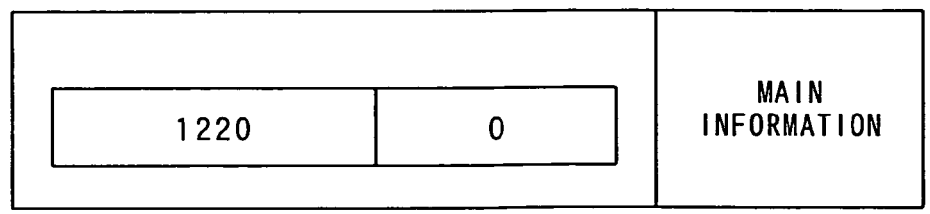

Further, as shown in FIG. 7(D), in the case of the target node ID of "1220" and the ID mask value of "0", higher "0" digit of the target node ID is effective, in other words, any digits may be any value (accordingly, the target node ID in this case may be any value), and all the nodes on the routing table become sending destination target of the catalog delivery message.

Further, in a case where the node ID is four digits quaternary number, the DHT multicast of the catalog delivery message sent from the node X being a catalog management node is carried out in four steps, stage one to stage four as shown in FIGS. 8 to 11.

(Stage One)

First, the node X sets a node ID "3102" of the own (own node) for a target node ID in the header section and "0" for an ID mask and generates a catalog delivery message including the header section and the payload section. Then as shown in FIGS. 7(A) and 7(B), the node X refers to the routing table shown in FIG. 6 and sends the catalog delivery message to representative nodes (nodes A, B, and C) registered in respective entries (i.e. belonging to respective areas as respective groups) of table level "1" where 1 is added to the ID mask "0".

(Stage Two)

Next, the node X generates a catalog delivery message where the ID mask "0" is converted into "1" in the header section of the above catalog delivery message. Here, because the target node ID is the own node ID, it does not change. Then the node X refers to the routing table as shown in FIG. 6 and sends the catalog delivery message to respective nodes (nodes D, E, and F) registered in the respective entries of the table level "2" where "1" is added to the ID mask "1" as shown in the upper right area of the node ID space in FIG. 9(A), and FIG. 9(B).

On the other hand, in the stage one, the node A receiving the catalog delivery message (catalog delivery message to the area where the own belongs) from the node X converts the ID mask "0" in the header section of the catalog delivery message into "1", and generates catalog delivery message where the target node ID "3102" is converted into the own node ID "0132". Then the node A refers to the own routing table (not shown) and sends the catalog delivery message to respective nodes (nodes A1, A2, and A3) registered in the respective entries of the table level "2" where "1" is added to the ID mask "1" as shown in the upper left area of the node ID space of FIG. 9(A), and FIG. 9(B). In other words, in a case where the area "0XXX" to which the own belongs is further divided into plural areas ("00XX", "01XX", "02XX", and "03XX"), the node A determines (representative) node one (nodes A1, A2, and A3) which belongs to the respective areas thus further divided and sends the catalog delivery message to all the nodes (nodes A1, A2, and A3) thus determined (hereinafter, similar manner).

Figure 9B:
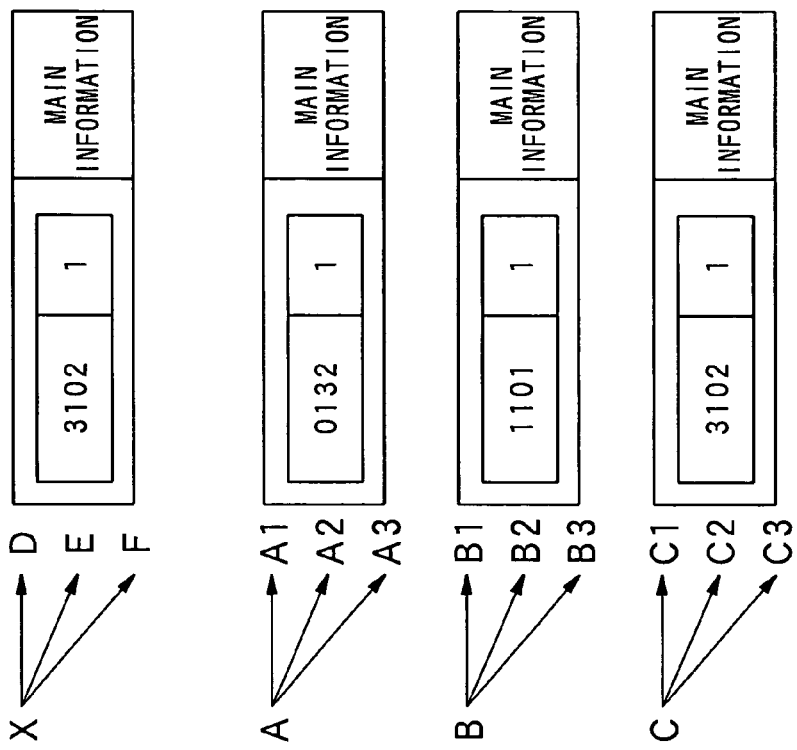
FIG. 9 is a view showing a state where DHT multicast is carried out.
Figure 9A:
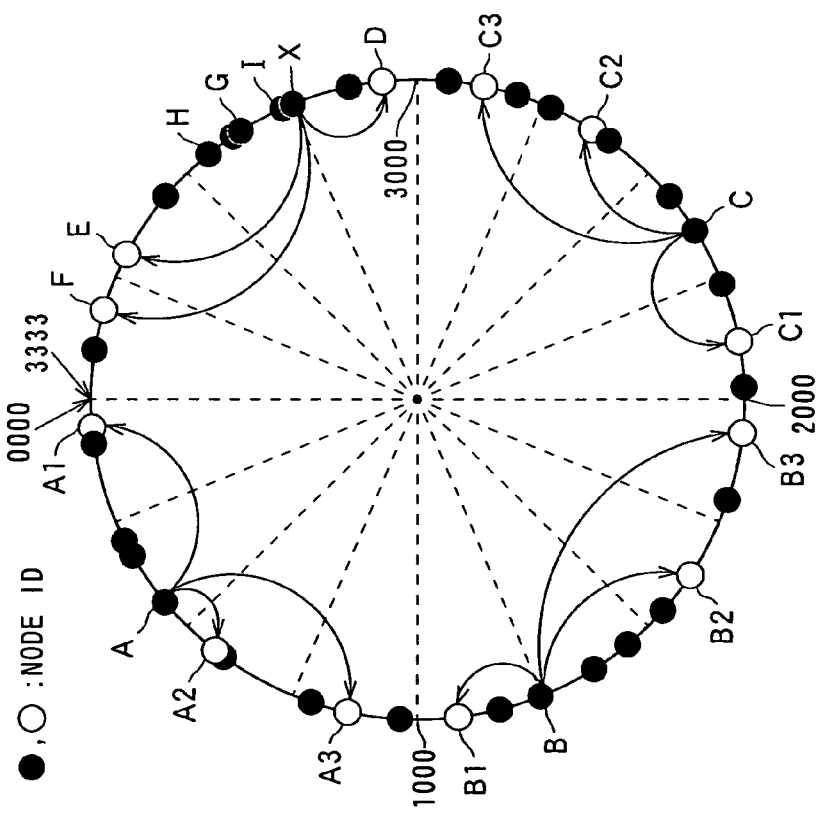

In a similar manner thereto, as shown in the lower left area and the lower right area of the node ID space in FIG. 9(A), and FIG. 9(B), in the stage one, the node B and node C receiving the catalog delivery message from the node X respectively refer to the own routing table, generate and send the catalog delivery message, where the ID mask is set to be "1" and the own node ID is set to be the target node ID, to the respective nodes (nodes B1, B2, B3, C1, C2, and C3) registered in the respective entries of the table level 2.

(Stage Three)

Next, the node X generates a catalog delivery message where the ID mask "1" is converted into "2" in the header section of the above catalog delivery message. Here, the target node ID does not change in the manner similar to the above. Then the node X refers to the routing table as shown in FIG. 6, and sends the catalog delivery message to respective nodes (nodes G and H) registered in the respective entries of the table level "3" where "1" is added to the ID mask "2" as shown in the upper right area of the node ID space in FIG. 10(A) and FIG. 10(B).

Figure 10B:
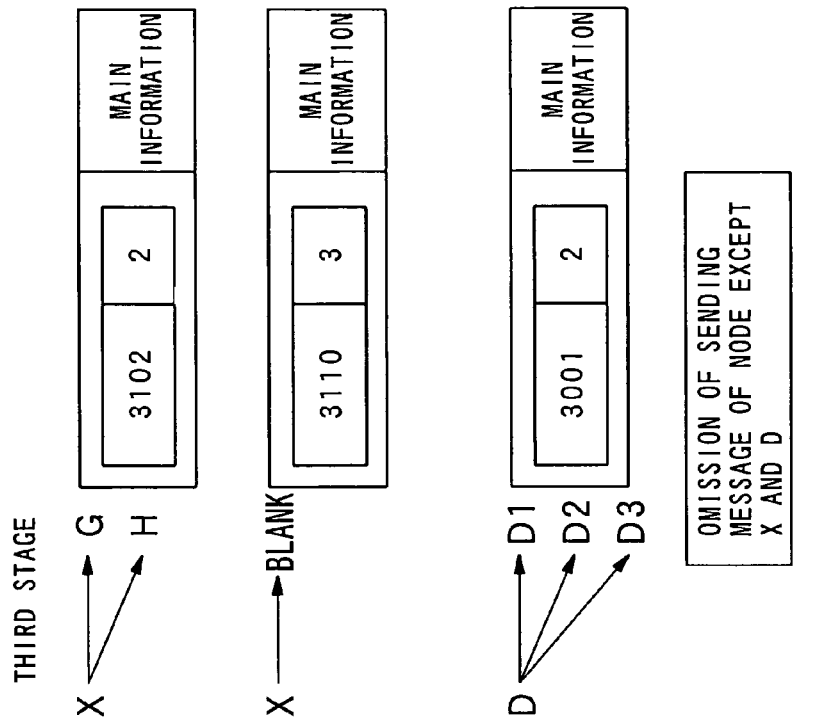
FIG. 10 is a view showing a state where DHT multicast is carried out.
Figure 10A:
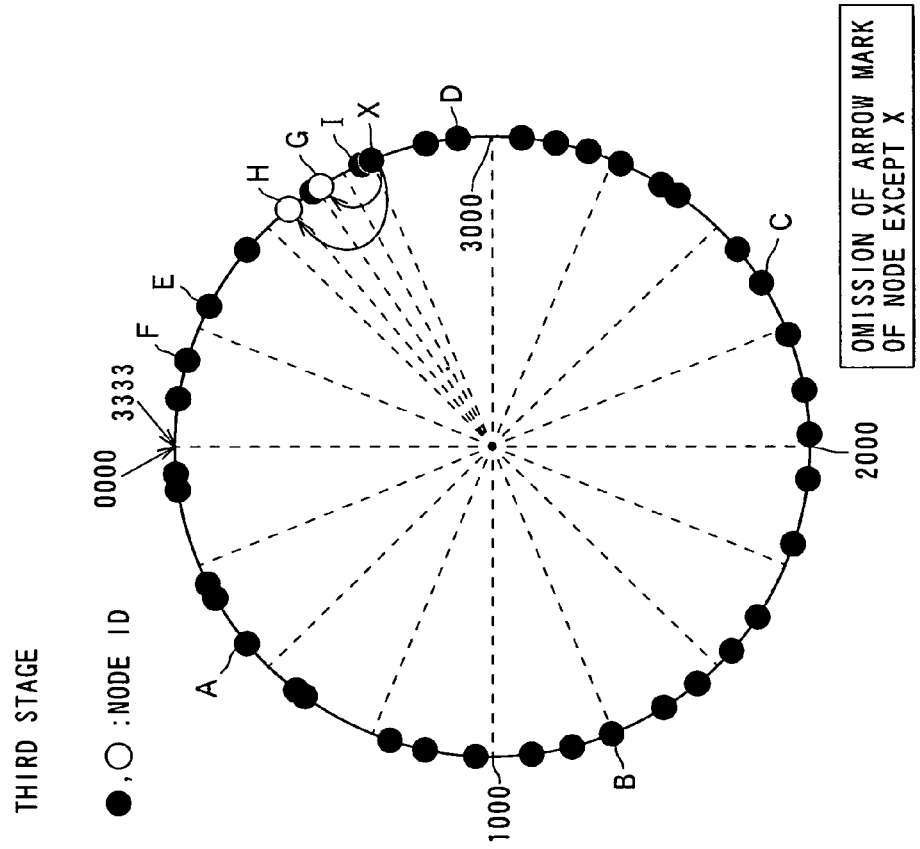

On the other hand, in the stage two, the node D receiving the catalog delivery message from the node X converts the ID mask "1" into "2" in the header section of the catalog delivery message, and generates a catalog delivery message where the target node ID "3102" is converted into the own node ID "3001". Then the node D refers to the own routing table and sends the catalog delivery message to respective nodes (nodes D1, D2, and D3) registered in the respective entries of the table level "3" where "1" is added to the ID mask "2" as shown in FIG. 10(B).

In a manner similar manner thereto, in the stage two, the nodes E, F, A1, A2, A3, B1, B2, B3, C1, C2, and C3 receiving the catalog delivery message respectively refer to the own routing table (not shown in figures), generate and send the catalog delivery message, where the ID mask is set to "2" and the own node ID is set to the target node ID, to the respective nodes (not shown in figures) registered in the respective entries of the table level 3.

(Stage Four)

Next, the node X generates a catalog delivery message where the ID mask "2" is converted into "3" in the header section of the above catalog delivery message. Here, the target node ID does not change in the manner similar to the above. Then the node X refers to the routing table as shown in FIG. 6 and sends the catalog delivery message to the node I registered in the respective entries of the table level "4" where "1" is added to the ID mask "3" as shown in the upper right area of the node ID space in FIG. 11(A) and FIG. 11(B).

On the other hand, in the stage three, the node G receiving the catalog delivery message from the node X converts the ID mask "2" into "3" in the header section of the catalog delivery message and generates a catalog delivery message where the target node ID "3102" is converted into the own node ID "3123". Then the node G refers to the own routing table and sends the catalog delivery message to the node G1 registered in the respective entries of the table level "4" where "1" is added to the ID mask "3" as shown in FIG. 11(B).

In a similar manner thereto, in the stage three, the respective nodes receiving the catalog delivery message also refer to the own routing table, generate and send the catalog delivery message, where the ID mask is set to be "3" and the own node ID is set up in the target node ID, with respect to the respective nodes registered in the respective entries of the table level 4. (not shown)

(Final Stage)

Finally, the node X generates a catalog delivery message where the ID mask "3" is converted into "4" in the header section of the above catalog delivery message. Then the node X recognizes that the catalog delivery message is addressed to the own (own node) based on the target node ID and the ID mask and finishes the sending process.

On the other hand, in the stage four, respective nodes 1 receiving a catalog delivery message also generates a catalog delivery message where the ID mask "3" is converted into "4" in the header section of the catalog delivery message. Then the node 1 recognizes that the catalog delivery message is addressed to the own (own node) based on the target node ID and the ID mask, and finishes the sending process.

Here, the unique ID included in the payload section of the catalog delivery message is an ID that is provided uniquely with respect to each catalog delivery message, and the ID does not change until a message one sent from, for example, the node X is transferred and reaches the final node. Further, in a case where a return message is returned from respective nodes in response to the catalog delivery message, the same unique ID as the catalog delivery message being a source is provided.

As described, the content catalog information is delivered to all the nodes participating in the overlay network 9 from the node X being the catalog management node by DHT multicast, and the respective nodes memorize content catalog information.

Further, in a case where content catalog information is updated, the content catalog information is delivered to all the nodes participating in the overlay network 9 from the node X being the catalog management node by DHT multicast, with respect to each update. In this case, the content catalog information describing attribute information of the content data of updated difference in entire content catalog information (hereinafter referred to as "update difference content catalog information") is sent from the node X. Thus delivered update difference content catalog information is incorporated in (added to) the content catalog information, already memorized in the respective nodes.

Here, "attribute information of the content data of updated difference in entire content catalog information" means attribute information of the content data where the content catalog information is newly registered, deleted, or changed. Thus only update difference content catalog information is sent by DHT multicast, thereby enabling to diminish amount of data sent and received and diminish load on the network 8 and a process load of respective nodes.

Meanwhile, in the content delivery system S, because respective nodes withdraw from the overlay network 9 (due to power discontinuity of the node device, partial disconnection of the network, or the like) and participate in the overlay network 9 (e.g. due to power off) highly frequently, all the nodes do not necessarily retain (memorize) the newest content catalog information (of the latest version information).

In other words, the withdrawn node is unable to receive then update difference content catalog information when the update difference content catalog information is delivered by DHT multicast, and therefore content catalog information retained becomes out of date when the node participates in the overlay network 9 later.

For this reason, in the present embodiment, the node receiving the update difference content catalog information delivered by DHT multicast compares between version information added to the update difference content catalog information and version information added to the content catalog information already memorized. A process is carried out based on the comparison result in such that the content catalog information of all the nodes participating in the overlay network 9 is renewed. The detailed process is described later.

2. Configuration and the Like Of Node

Next, with reference to FIG. 12, configuration and function of nodes will be explained.

Figure 12:
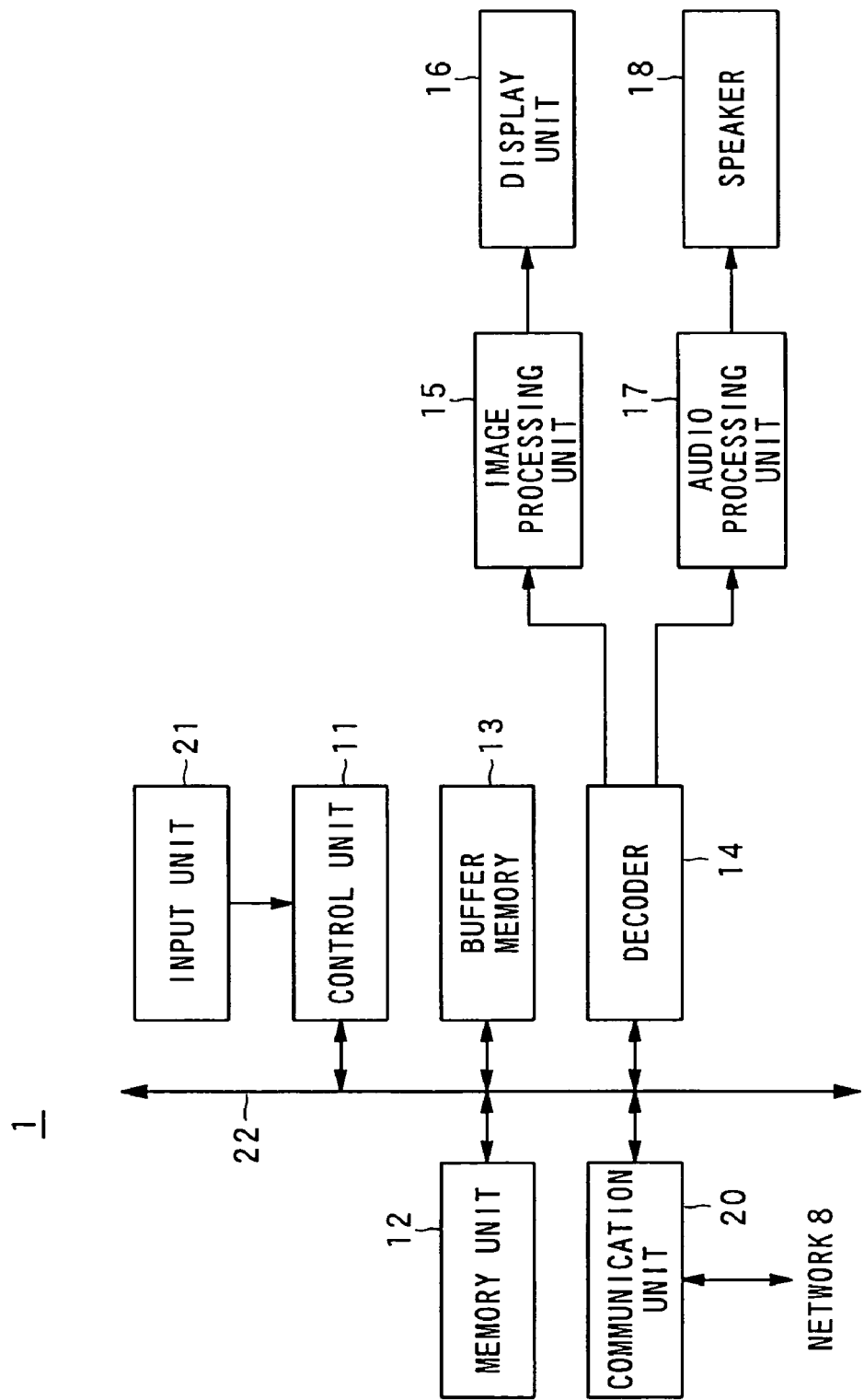
FIG. 12 is a view showing a general configuration of the node.

FIG. 12 is a view showing a schematic configuration example of a node.

The respective nodes are configured by including, as shown in FIG. 12: a control unit 11 being a computer configured by a CPU having computing function, a RAM for work, and a ROM for memorizing various data and programs; a memory unit 12 being an address information memory means configured by HD or the like for memorizing and storing content data, content catalog information, a routing table, various types of programs or the like; a buffer memory 13 for temporarily storing received content data and the like; a decoder 14 for decoding (stretching data, decrypting or the like) encoded video data (image information), audio data (voice information) or the like included in the content data; an image processing unit 15 for providing a predetermined graphic process to the video data thus decoded or the like and outputting the data as video signal; a display unit 16 such as CRT or liquid crystal display for displaying image based on the video signal outputted from the image processing unit 15; an audio processing unit 17 for converting thus decoded audio data into an analog audio signal in use of digital/analog (D/A) conversion, amplifying thus converted signal by an amplifier and outputting the same; a speaker 18 for outputting the audio signal thus outputted from the audio processing unit 17 as acoustic wave; a communication unit 20 for carrying out communication control of information with respect to other nodes via the network 8; and an input unit 21 (e.g. a keyboard, a mouse, or an operation panel) for receiving an instruction from a user and providing the instruction signal to the control unit 11 in response to the instruction, wherein the control unit 11, the memory unit 12, the buffer memory 13, the decoder 14, and the communication unit 20 are connected each other via a bus 22. As a node, a personal computer, STB (Set Top Box), TV receiving device or the like is applicable.

Then, CPU executes various programs (including a node process program) memorized in the memory unit 12, so that the control unit 11 controls overall nodes. Further, the control unit 11 functions as a search request information sending means, a search result information receiving means, a scope judge means, a shortage scope acquisition means, a content catalog information acquisition means, a search result information return means, a search request information transfer means, a content specification means, a content catalog information sending means, and a content catalog information receiving means, and carries out processes described later.

Meanwhile, several KB (kilobyte) to several MB (megabyte) in, for example, a memory region of the memory unit 12 are allocated to a catalog cache region for memorizing content catalog information. Such the content catalog information may be previously memorized, for example, at the time of manufacturing or selling nodes, or may be delivered and memorized by DHT multicast later.

Further, the node process program may be downloaded from, for example, a predetermined server on the network 8, or the program may be recorded in a recording medium such as CD-ROM and read in through, for example, a drive of the recording medium.

3. Operation of Content Delivery System

3.1 Embodiment 1

Next, an operation of the content delivery system S in the embodiment 1 is explained with reference to FIGS. 13 to 15.

The embodiment 1 is a mode where entire catalog information is memorized in respective nodes.

Figure 13:
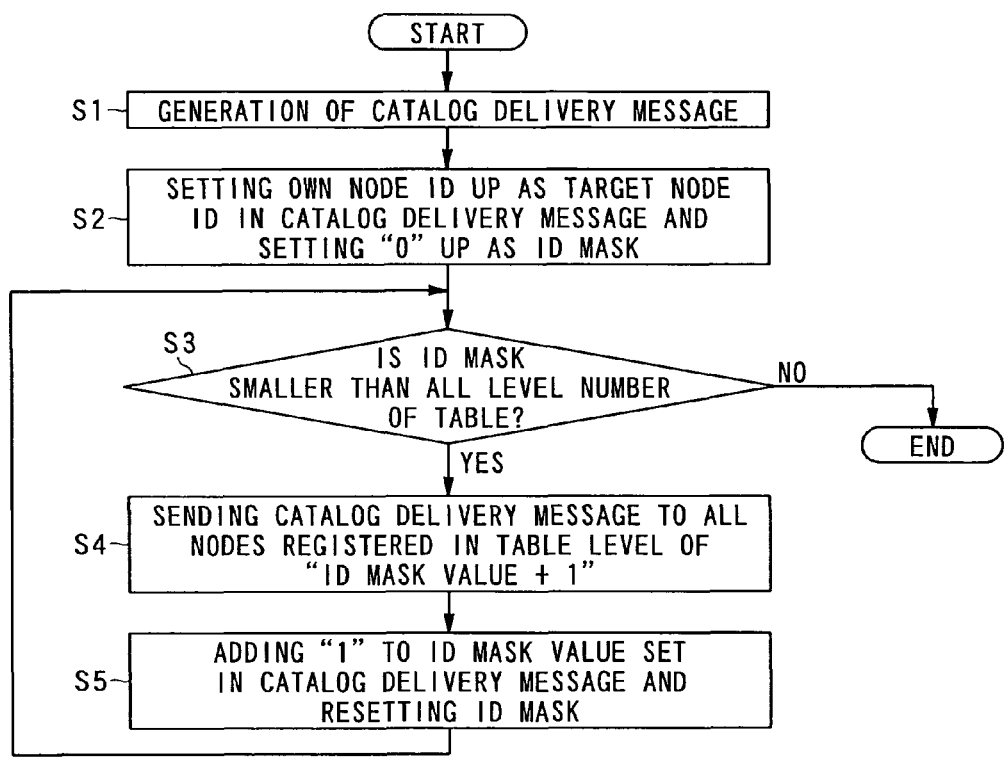
FIG. 13 is a flowchart showing a DHT multicast process in a catalog management node.

FIG. 13 is a flowchart showing a DHT multicast process in a catalog management node. FIG. 14 is a flowchart showing a process in a node receiving the catalog delivery message. FIG. 15 is a flowchart showing a catalog information receiving process in FIG. 14 in detail.

The respective nodes participating in the overlay network 9 are activated (i.e. powered in and initializing various settings) and in a standby state for an instruction from users through the input unit 21 and in a standby state for receiving a message from the other nodes through the network 8.

Further, the content catalog information is already memorized in the respective nodes participating in the overlay network 9.

When content catalog information is updated (also referred to as version up, and content catalog information being entirely updated in some cases and partially in other cases), for example, in a node X being a catalog management node, a process shown in FIG. 13 starts, and the control unit 11 of the node X acquires a unique ID and the above-mentioned update difference content catalog information and generates a catalog delivery message included including thus acquired unique ID and the update difference content catalog information in the payload section (Step S1).

Next, the control unit 11 of the node X sets the own node ID "3102" as a target node ID in the header section of the catalog delivery message thus generated, sets "0" up as an ID mask, and sets the own IP address up as an IP address (Step S2).

Next, the control unit 11 judges (determines) whether or not the ID mask value thus set up is smaller than all level number ("4" in an example of FIG. 6) of the own routing table (Step S3).

Since "0" is set up in the ID mask now and the ID mask value is smaller than all level number of the routing table, the control unit 11 judges that the ID mask is smaller than all level number of the routing table (Step S3: YES), determines all the nodes that are registered in the level of "ID mask thus set+1" in the own routing table (i.e. determining node one that belongs to the further divided respective areas since an area where the node X belongs is further divided into plural areas), and sends thus generated catalog delivery message to thus determined node (Step S4).

For example, in an example of FIG. 6, the catalog delivery message is sent to the node A, node B, and node C that are registered in the level 1 being "ID mask "0"+1".

Next, the control unit 11 adds "1" to the ID mask value set in the header section of the catalog delivery message, resets the ID mask (Step S5), and returns to Step S3.

Then the control unit 11 similarly repeats the process of Steps S3 to S5 with respect to ID masks "1", "2", and "3". Accordingly, the catalog delivery message is sent to all the nodes registered in the own routing table.

On the other hand, in Step S3, in a case where it is judged that the ID mask value is not smaller than all level number (the ID mask value being "4" in an example of FIG. 6), the process is finished.

Figure 14:
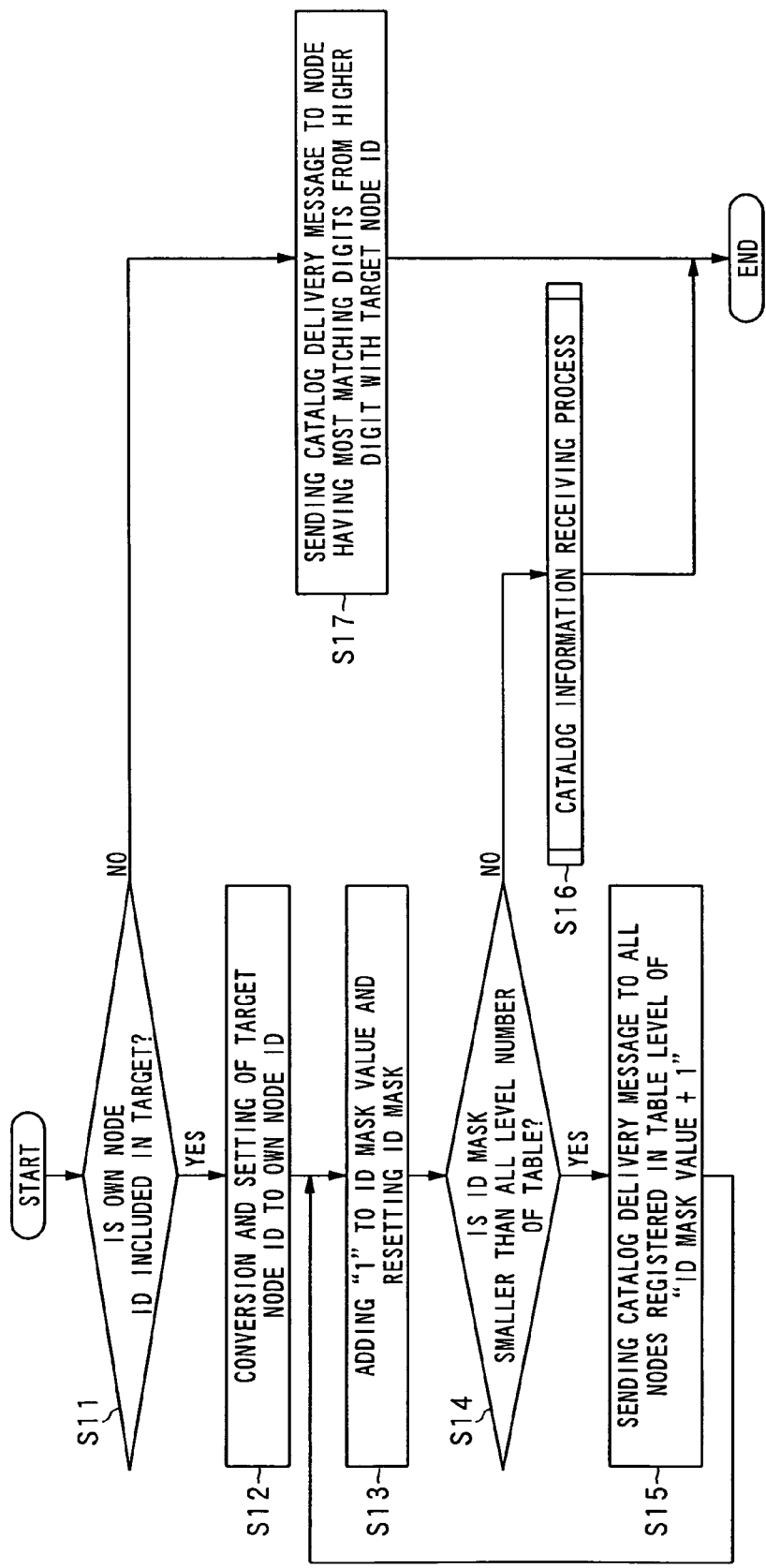
FIG. 14 is a flowchart showing a process in a node receiving the catalog delivery message.

Next, the respective nodes receiving thus sent catalog delivery message temporarily store the catalog delivery message and start the process shown in FIG. 14. Here the node A is exemplified for explanation.

When the process shown in FIG. 14 starts, the control unit 11 of the node A judges whether or not the own node ID is included in the target specified by the target node ID and the ID mask in the header section of the received catalog delivery message (Step S1).

Here, the target indicates the node ID having common upper digits corresponding to the value of the ID mask in the target node ID. For example, in a case of ID mask "0", all the node IDs are included in the target. For example, in a case where ID mask is "2" and target node ID is "3102", the node ID of "31" ( may be any value) with its upper "2" digits being "31" is included in the target.

Since the ID mask in the header section of the catalog delivery message that is received by the node A is "0" and effective digit number thereof is not designated, the control unit 11 of the node A judges that the own node ID "0132" is included in the target (Step S11: YES), and converts the target node ID at the header section of the catalog delivery message to the own node ID "0132" and sets this up (Step S12).

Next, the control unit 11 resets the ID mask by adding "1" to the ID mask value in the header section of the catalog delivery message (here, converting from "0" to "1", and changing the ID mask indicative of the level one to the ID mask indicative of the next level)) (Step S13).

Next, the control unit 11 judges whether or not thus reset ID mask value is smaller than all level number of the own routing table (Step S14).

Now, since the ID mask is set up to be "1", and smaller than all level number of the routing table, the control unit 11 judges that the ID mask is smaller than all level number of the routing table (Step S14: YES), determines all the nodes registered in the level "thus reset ID mask+1" (i.e. determining node one belonging to respective areas that are further divided because the area where the node A belongs is further divided into plural areas), sends thus generated catalog delivery message to thus determined node (Step S15), and returns to the Step S13.

For example, the catalog delivery message is sent to node A1, node A2, and node A3 registered in the level 2 being "ID mask "1"+1".

Subsequently, the control unit 11 similarly repeats the process of Steps S14 and S15 with respect to ID masks "2" and "3". Accordingly, the catalog delivery message is sent to all the nodes registered in the own routing table.

On the other hand, in the above Step S11, in a case where the control unit 11 judges that the own node ID is not included in the target specified by the target node ID and the ID mask in the header section of the received catalog delivery message (Step S11: NO), the control unit 11 sends (transfers) thus received catalog delivery message to the node having the upper digits matching the most with the target node ID in the routing table (Step S17). Then the process ends.

For example, if the ID mask is "2" and the target node ID is "3102", it is judged that the node ID "0132" of the node A is not included in the target "31**". Here, the transfer process of Step S17 is a process of transferring a message using the ordinary DHT routing table.

On the contrary, in a case where the control unit 11 judges that the ID mask value is not smaller than all level number of the own routing table in the above Step S14 (Step S14: NO), the control unit 11 starts a catalog information receiving process (Step S16). Here, such the catalog information receiving process is carried out in respective nodes receiving the catalog delivery message.

Figure 15:
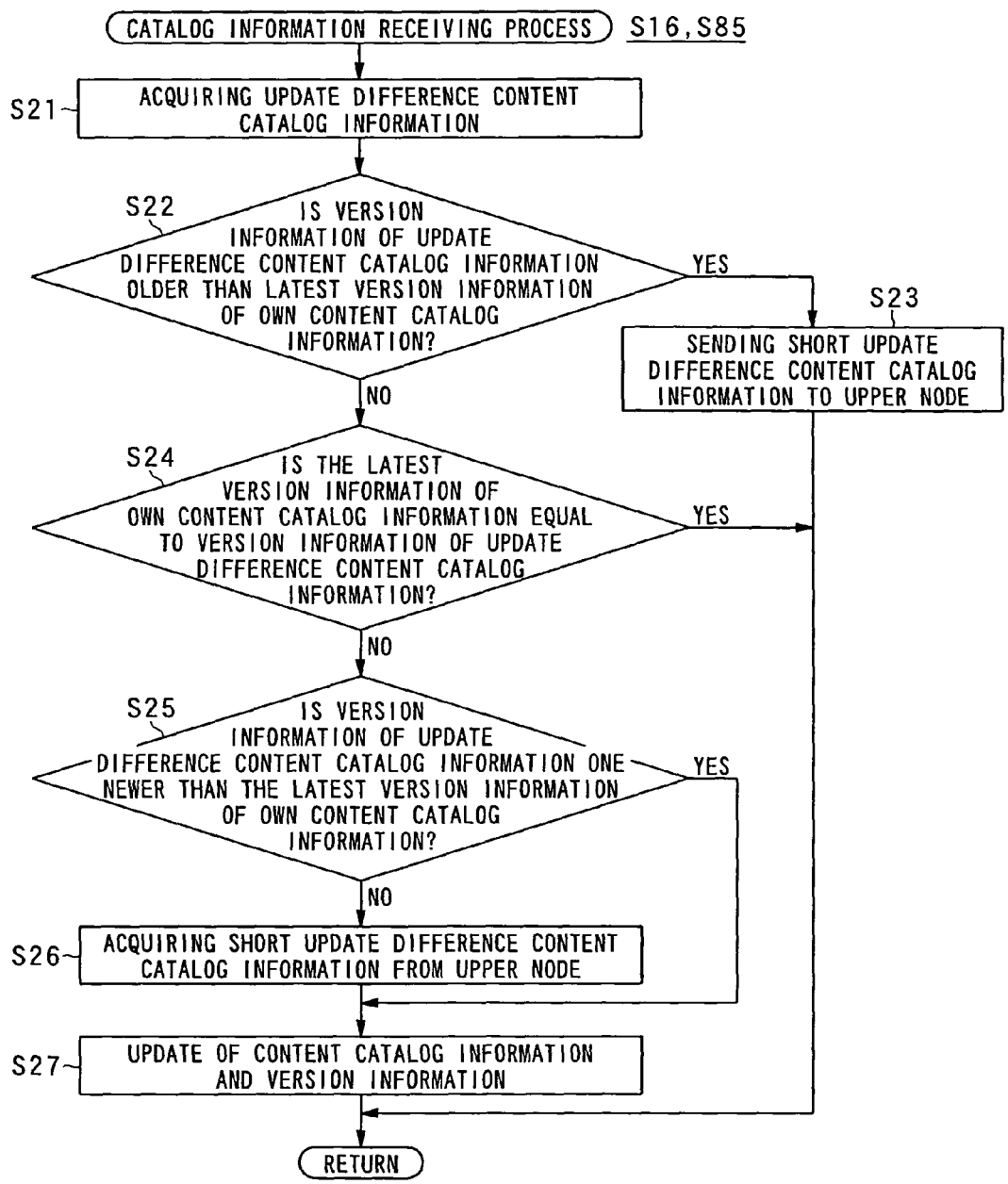
FIG. 15 is a flowchart showing a catalog information receiving process in FIG. 14 in detail.

In the catalog information receiving process as shown in FIG. 15, the control unit 11 of the node receiving the catalog delivery message first acquires update difference content catalog information in the payload section of the catalog delivery message (Step S21), compares between version information (version serial number) added to the update difference content catalog information and version information (version serial number) added to the content catalog information already memorized in the own memory unit 12, and judges whether or not the version information added to thus acquired update difference content catalog information is out of date based on the latest version information added to the content catalog information already memorized in the own memory unit 12 (Step S22).

Based on the comparison result, in a case where the version information added to thus acquired update difference content catalog information is older than the latest version information added to the content catalog information already memorized in the memory unit 12 of the own (e.g. the version serial number "6" added to the update difference content catalog information being smaller than the latest version serial number "8" added to already memorized content catalog information) (Step S22: YES), the control unit 11 adds version information indicative of the new version to update difference content catalog information (e.g. update difference content catalog information corresponding to version serial numbers "7" and "8") corresponding to the version being newer than thus acquired update difference content catalog information, and sends to the upper node (e.g. node X sending the catalog delivery message in the case of node A, and node A sending the catalog delivery message in the case of node A1) sending the catalog delivery message (Step S23). In other words, since the upper node sending the catalog delivery message holds older version than the content catalog information held by the own, shortage portion of the update difference content catalog information is provided.

Thus it happens that the upper node (other than node X) transferring the catalog delivery message has older version than that of the content catalog information held by the own. This is because, for example, when content catalog information is intermittently updated plural times in short time, update difference content catalog information is intermittently sent to the node X plural times by DHT multicast, and a node participates in or withdraws from the overlay network 9 while the update difference content catalog information is being transferred, the transfer route changes, and the latest version of update difference content catalog information that is sent later from the node X reaches the own before update difference content catalog information that is sent earlier from the node X, in some cases.

On the other hand, based on the result of the comparison, in a case where the version information added to thus acquired update difference content catalog information is not older than the latest version information added to the content catalog information already memorized in the memory unit 12 of the own (i.e. same or newer) (Step S22: NO), the control unit 11 compares between version information added to the acquired update difference content catalog information and the latest version information added to the content catalog information already memorized in the memory unit 12, and judges whether or not the version information added to the acquired update difference content catalog information is equal to (or same as) the latest version information added to the content catalog information already memorized in the memory unit 12 of the own (Step S24).

Based on the result of this comparison, in a case where the version information added to the acquired update difference content catalog information is equal to the latest version information added to the content catalog information already memorized in the memory unit 12 of the own (Step S24: YES), the process is finished without change.

Thus, it happens that the upper node (other than node X) transferring the above-mentioned catalog delivery message has the content catalog information equal to that of the own. This is because, for example, when update difference content catalog information is sent from the node X by DHT multicast, a node participates in or withdraws from the overlay network 9 while the update difference content catalog information is transferred, the transfer route changes, and same update difference content catalog information may also reach the own node later from the other route.

On the other hand, as the result of the comparison, in a case where the version information added to thus acquired update difference content catalog information is not equal to the latest version information added to the content catalog information already memorized in the memory unit 12 of the own (i.e. new) (Step S24: NO), the control unit 11 compares between version information added to the acquired update difference content catalog information and the latest version information added to the content catalog information already memorized in the memory unit 12, and judges whether or not the version information added to the update difference content catalog information is newer by one step than the latest version information added to the content catalog information already memorized in the memory unit 12 of the own (Step S25).

Based on the result of this comparison, in a case where the version information added to the acquired update difference content catalog information is one step newer than the latest version information added to the content catalog information already memorized in the memory unit 12 of the own (for example, a serial version number added to the update difference content catalog information being larger by 1 than a serial number of the latest serial version number added to the content catalog information already memorized) (Step S25: YES), the control unit 11 updates content catalog information and the version information that are already memorized based on the attribute information and the version information of the content data described in the update difference content catalog information (Step S27), and the process is finished. For example, the attribute information of the content data described in thus acquired update difference content catalog information is added to and registered in the content catalog information already memorized and the version is upgraded.

On the contrary, based on the result of the comparison, in a case where the version information added to the acquired update difference content catalog information is not one step newer than the version information added to the content catalog information already memorized (i.e. two or more steps new) (for example, a serial version number added to the update difference content catalog information being larger by two or more than the latest serial version number added to the content catalog information already memorized) (Step S25: NO), the control unit 11 requests update difference content catalog information (i.e. shortage of update difference content catalog information) corresponding to version information to be located between both of the version information (e.g. "6" and "7" located between "5" and "8" in terms of serial version number) to the upper node sending the catalog delivery message, and acquires it (Step S26).

Then the control unit 11 updates the content catalog information and version information that are already memorized based on each update difference content catalog information and these pieces of version information that are acquired in Steps S21 and S26 (Step S27), and finishes the process. For example, attribute information of the content data described in each of the update difference content catalog information acquired in Steps S21 and S26 is added to and registered in the content catalog information already memorized, and the version is upgraded.

As explained above, according to the embodiment 1, it is configured such that the update difference content catalog information is delivered (distributed) to all nodes participating in the overlay network 2 by DHT multicast. Therefore, it is possible to prevent much load from burdening on a specific management device such as a catalog management server because respective nodes need not to connect the catalog management server to request the latest content catalog information. Further, it is possible for respective node users to constantly search desired latest content from the content catalog information because respective nodes can keep the latest content catalog information memorized.

Further, for example, only an updated difference is delivered as update difference content catalog information by DHT multicast only when content catalog information in a catalog management node is updated. Therefore, it is possible to reduce amount of data sent and received, load of the network 8, and process load in respective nodes.

Further, in a case where respective nodes compare between version information added to the received update difference content catalog information and version information added to the content catalog information already memorized in catalog cache region of the own, and the version information added to the received update difference content catalog information is one step newer than the version information added to the content catalog information already memorized, the content of the update difference content catalog information is incorporated in the content catalog information already memorized and then it is updated. Further, in a case where the version information added to the received update difference content catalog information is two or more newer than the version information added to the content catalog information already memorized, update difference content catalog information corresponding to version information to be located between both of the version information is acquired from an upper node, the content of thus acquired update difference content catalog information is also incorporated in the content catalog information already memorized, and then it is updated. Therefore, it is possible to more efficiently acquire the update difference content catalog information delivered during withdrawal without using a specific management device such as a catalog management server, because even the node withdrawing for a while can acquire the update difference content catalog information from the node having participated after re-participation.

Further, in a case where respective nodes compare between version information added to the received update difference content catalog information and version information added to the content catalog information already memorized in the catalog cache region of the own node, and the version information added to the received update difference content catalog information is older than the version information added to the content catalog information already memorized, the update difference content catalog information corresponding to a version newer than that of the received update difference content catalog information is sent to the upper node sending old content catalog information. Therefore, it is possible to appropriately distribute the latest content catalog information throughout all nodes. Therefore, even in a case where the update difference content catalog information is sent plural times continuously from the node X by a DHT multicast, a node participates in or withdraws from the overlay network 9, and the transfer route changes during the transfer of the update difference content catalog information.

(Modified Embodiment of DHT Multicast Process)

Although, in the DHT multicast process shown in FIG. 13, respective nodes send the catalog delivery message to only the node having the IP address memorized in the own routing table, a modified example that the catalog delivery message is also sent to the node having no IP address registered (memorized) in the routing table will be described with reference to FIGS. 16 to 18.

When the node participates in and withdraws from the overlay network 9, it may not be reflected yet in the routing table in some nodes. In this case, it potentially happens that the catalog delivery message is not delivered throughout all the nodes by the above-mentioned DHT multicast. According to this modified example, it is possible to send the catalog delivery message to all the nodes participating in the overlay network 9 even though such the event occurs.

In this modified example, redundant explanation is omitted with respect to the similar portion to the above-mentioned embodiment 1.

The above-mentioned process shown in FIG. 15 is also applied in this modified example and carried out in a manner similar to the above-mentioned embodiment 1.

Figure 16:
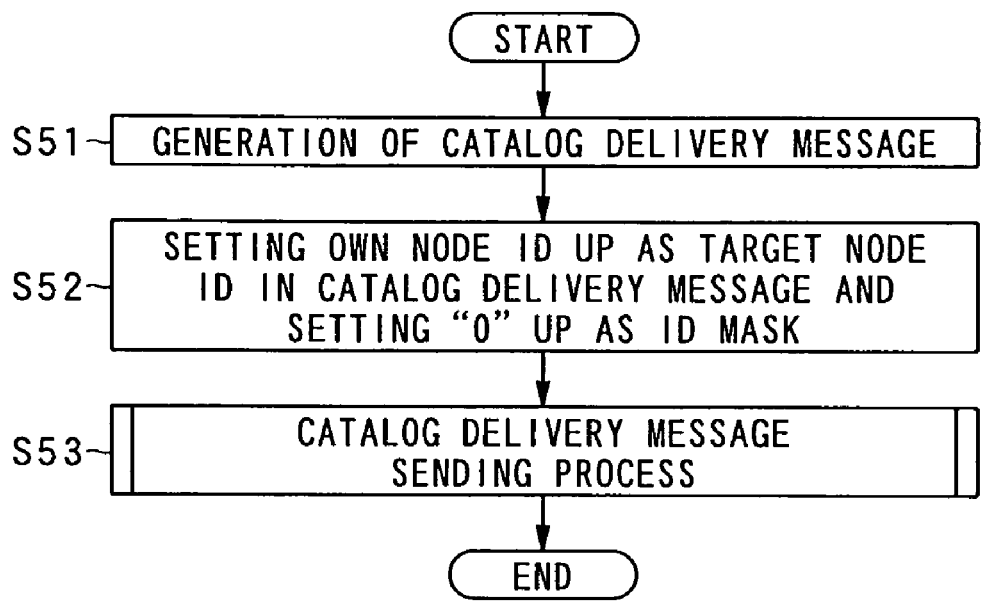
FIG. 16 is a flowchart showing a DHT multicast process in the catalog management node.
Figure 17:
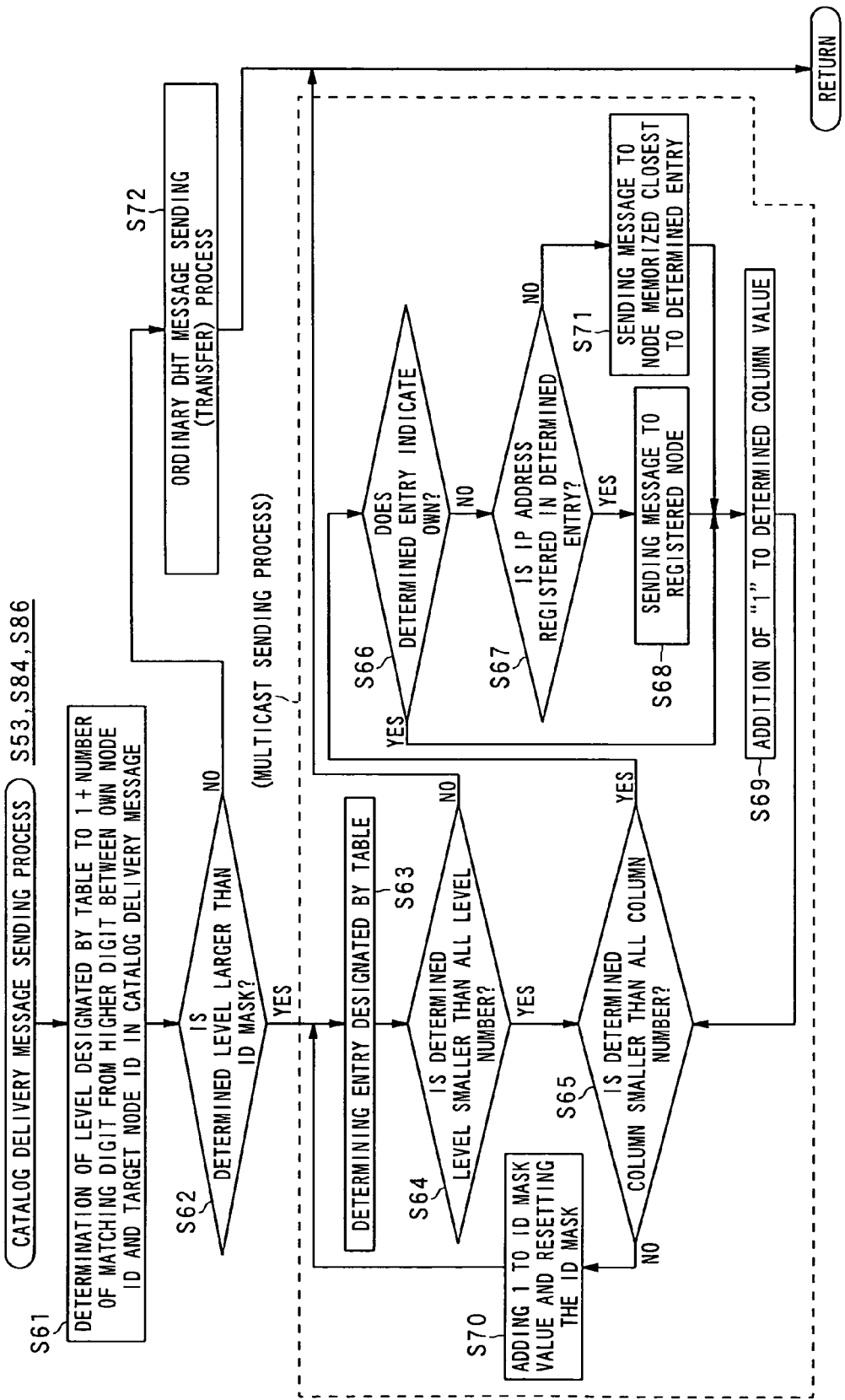
FIG. 17 is a flowchart showing a DHT multicast process in the catalog management node.

On the other hand, the above-mentioned process shown in FIG. 13 is not applied to this modified example, but the processes shown in FIGS. 16 and 17 are carried out instead. Further, the above-mentioned process shown in FIG. 14 is not applied to this modified example. Instead the process shown in FIG. 18 is carried out.

Further, the header section of the catalog delivery message sent in this modified example includes a transfer frequency integrated value (value increasing by one count every time the node is transferred) and a transfer frequency upper limit value. This is to prevent the possibility that the message is continued to transfer, in a case where the catalog delivery message is sent to the node having the IP address not registered in the routing table.

In a DHT multicast process shown in FIG. 16, the control unit 11 of the node X generates a catalog delivery message including the acquired unique ID and the update difference content catalog information in the payload section in a manner similar to Step S1 in FIG. 13 (Step S51).

Next, the control unit 11 of the node X sets the own node ID "3102" up as a target node ID at the header section of thus generated catalog delivery message, sets "0" up as an ID mask, and sets the own IP address up as an IP address (Step S52).

Next, the control unit 11 starts a catalog delivery message sending process (Step S53).

In the catalog delivery message sending process shown in FIG. 17, the control unit 11 of the node X determines the level designated at the number of matching digits from the upper digits+1 where digits matches between the own node ID and the target node ID in thus generated catalog delivery message (Step S61).

For example, in a case where the own node ID is "3102" and the target node ID is "3102", all digits match and the number of matching digits is "4". Therefore, 1 is added to this and the level of the routing table is determined at level "5".

Next, the control unit 11 judges whether or not thus determined level is larger than the ID mask in thus generated catalog delivery message (Step S62).

In the above-mentioned example, since the determined level "5" is larger than the ID mask "0" in the catalog delivery message, the control unit 11 judges that the determined level is larger than the ID mask (Step S62: YES) and goes to Step S63.

In Step S63, the control unit 11 determines the entry designated by the own routing table (i.e. level and column). More specifically, the control unit 11 respectively determines the designated level at "1+ the ID mask value in the catalog delivery message" and determines the designated columns in line from left end of the level.

Here, in a case where the routing table consists of A digits and B base number, the level value is 1 to A and the column value is 1 to B. In a case of 4 digits and 4 base numbers as described above, the level is 1 to 4 (the number of all levels is 4) and the column is 1 to 4 (the number of all columns is 4). In the above example, because the ID mask in the catalog delivery message is "0", the entry of "level 1, column 1" in the routing table is designated.

Next, the control unit 11 judges whether or not the level value thus determined is smaller than the number of all levels (Step S64). In the above example, because the determined level value "1" is less than the number of all levels "4", the control unit 11 judges that the determined level value is less than the number of all levels (Step S64: YES), and then judges whether or not the determined column value is less than the number of all columns (Step S65). In the above example, since the determined column value "1" is less than the number of all columns "4", the control unit 11 judges that the determined level value is less than the number of all levels (Step S65: YES). Subsequently, the control unit 11 judges whether or not the determined entry indicates the own (own node ID) (Step S66). In the above example, since the own node ID is not registered in the determined entry "level 1, column 1", the control unit 11 judges that the determined entry does not indicate the own (Step S66: NO) and goes to Step S67.

In Step S67, the control unit 11 judges whether or not the IP address or the like of the node is registered in the determined entry. In the above example, since the IP address of the node A is registered in the determined entry of "level 1, column 1", the control unit 11 judges that the IP address or the like of the node is registered in the determined entry (Step S67: YES) and sends the catalog delivery message to thus registered node (according to the IP address) (Step S68).

Next, the control unit 11 adds "1" to the value of the determined column (Step S69) and returns to Step S65.

Then, processes of Steps S65 to S69 are repeated, and for example in FIG. 5, the catalog delivery message is also sent to the node B registered in the entry of "level 1, column 2" and the node C registered in the entry of "level 1, column 3", and the determined entry is changed to "level 1, column 4". Then the process returns to Step S65.

Next, in the process of Step S66 through the Step S65, since thus determined entry of "level 1, column 4" indicates the own node, the control unit 11 judges that the determined entry indicates the own node (Step S66: YES) and goes to Step S69. Therefore, the catalog delivery message can be sent to all the nodes 1 registered in the level 1 of the routing table.

On the other hand, in the process of the Step S65, in a case where it is judged that the determined column value is not less than the number of all columns (Step S65: NO), the control unit 11 adds 1 to the value of the ID mask set in the header section in the catalog delivery message and resets the ID mask (Step S70), returns to Step S63 and repeats the similar processes.

Meanwhile, in the process of the Step S67, in a case where the IP address or the like of the node is not registered in thus determined entry (Step S67: NO), the control unit 11 sends the catalog delivery message to the node memorized closest to thus determined entry (e.g. "level 3, column 2") (Step S71). In the above example, the ID mask value is "3", and the target node ID is "3110" which falls into the entry of "level 3, column 2".

Therefore, in a case where the node corresponding to this entry participates, the catalog delivery message can be sent by specifying the target. Here, in the above example, the catalog delivery message may be sent to transfer the node G.

Here, the upper limit value of the transfer frequency in the header section of the catalog delivery message is a value to determine the upper limit of transfer frequency and is set up to prevent the message from continuous transfer in a case where the node to be a target does not exist. The upper limit value of the transfer frequency has a rather larger value absolutely not exceeding in the ordinary transfer. For example, in a case of using the routing table having the level number of 4, it is ordinary that the transfer frequency is within four times. In this case, the upper limit value of the transfer frequency is, for example, 8 times and 16 times.

On the other hand, in the process of the Step S64, it is judged that thus determined level value is not the number of all levels or less (Step S64: NO). Then the process ends.

Meanwhile, in the process of the Step S61, for example, in a case where the own node ID is "3102", the target node ID is "2132", the ID mask is "4", the number of matching digits is "0", 1 is added thereto, and the designated level of the routing table is determined to be "1". In this case, in Step S62, since the determined level is smaller than the ID mask "4" in the catalog delivery message, the process goes to Step S72, and the ordinary DHT message sending (transfer) process is carried out. More particularly, the control unit 11 determines the node the closest to the target node ID in the determined level and registered in the routing table, sends (transfers) the catalog delivery message to the node. Then the process ends.

Figure 18:
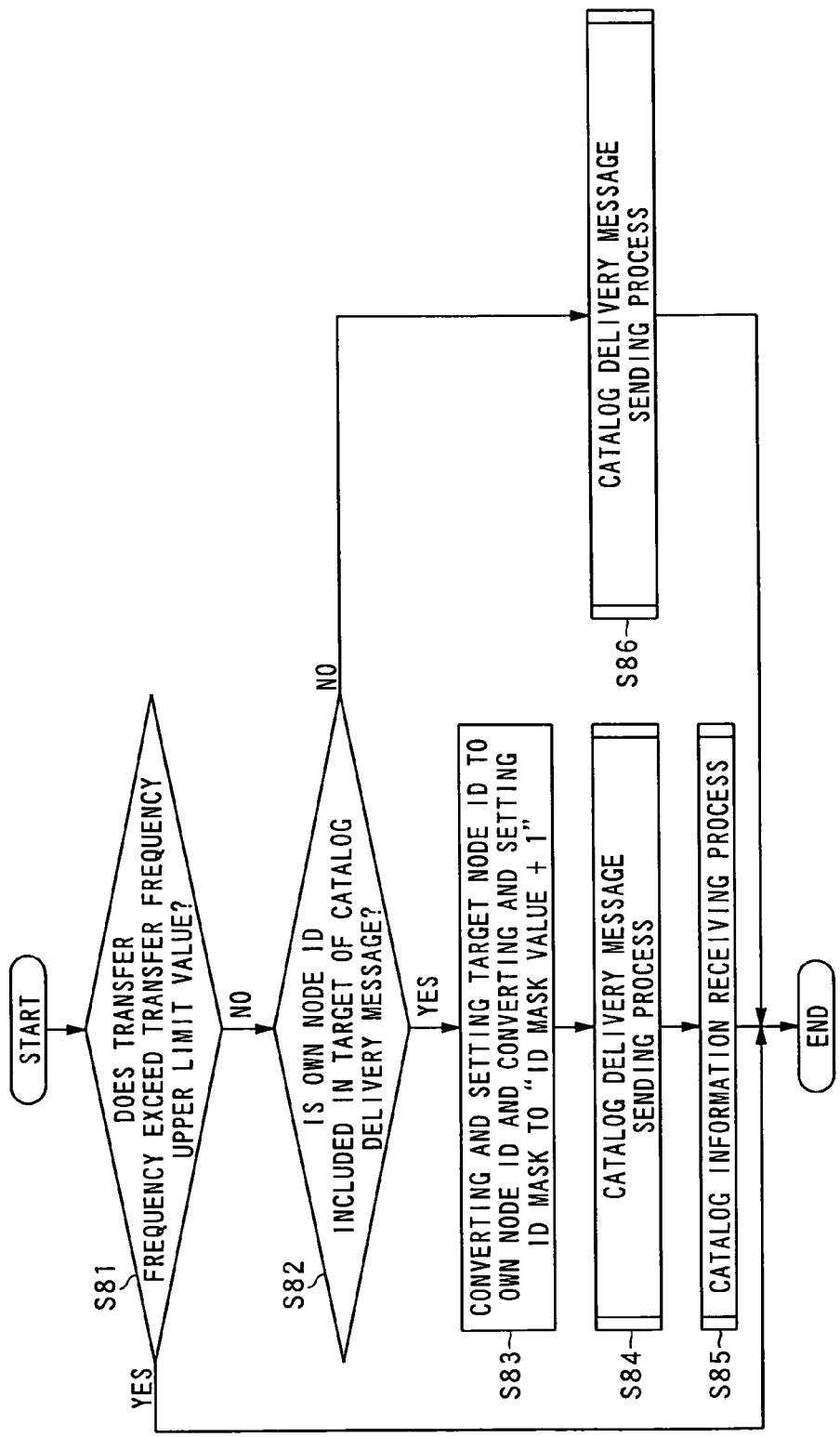
FIG. 18 is a flowchart showing a process in a node receiving the catalog delivery message.

Next, the respective nodes receiving thus sent catalog delivery message memorize the catalog delivery message and start the process shown in FIG. 18.

When the process shown in FIG. 18 starts, the control unit 11 of the node judges whether or not the transfer frequency of the catalog delivery message exceeds the upper limit value of the transfer frequency (Step S81). In a case where it does not exceed the upper limit value of the transfer frequency (Step S81: NO), the own node ID judges whether or not it is included in the target of the received catalog delivery message (Step S82). Here, in a case where the ID mask in the catalog delivery message is "0", since all the nodes ID are included as described above, the control unit 11 judges that the own node ID is included in the above target (Step S82: YES), sets to convert the target node ID in the header section of the received catalog delivery message into the own node ID, sets to convert the ID mask into "1+ the ID mask value of the catalog delivery message" (Step S83), and carries out the catalog delivery message sending process as shown in FIG. 17 with respect to the catalog delivery message (Step S84). Then upon the completion of the catalog delivery message sending process, the control unit 11 carries out the catalog information receiving process as shown in FIG. 15 in a similar manner to the above embodiment 1 (Step S85). Then the process ends.

On the other hand, in the process of the above Step S82, in a case where it is judged that the own node ID is not included in the target (Step S82: NO), the control unit 11 carries out the catalog delivery message sending process as shown in FIG. 17 with respect to thus received catalog delivery message (Step S86). Then the process ends.

Meanwhile, in the process of Step S81, it is judged that the transfer frequency of thus received catalog delivery message exceeds the upper limit value of the transfer frequency (Step S81: YES), transfer is not carried out. Then the process ends.

As described above, according to the modified example of the DHT multicast process, even in the case where the nodes carry out participation in or withdrawal from the overlay network 9 and it is not yet reflected in the routing table of the node thereof, the catalog delivery message can be sent to all the nodes participating in the overlay network 9.

3.2 Embodiment 2

3.2.1 Memory Operation Of Content Catalog Information

Next, operation of content delivery system S in embodiment 2 will be described. Here in this embodiment 2, duplicated explanation is omitted with respect to the similar portion to the above-mentioned embodiment 1.

Further, the above-mentioned FIGS. 13, 14, 16 and 18 are also applied to the embodiment 2 and carried out in a manner similar to the above-mentioned embodiment 1 or the modified example.

Figure 19:
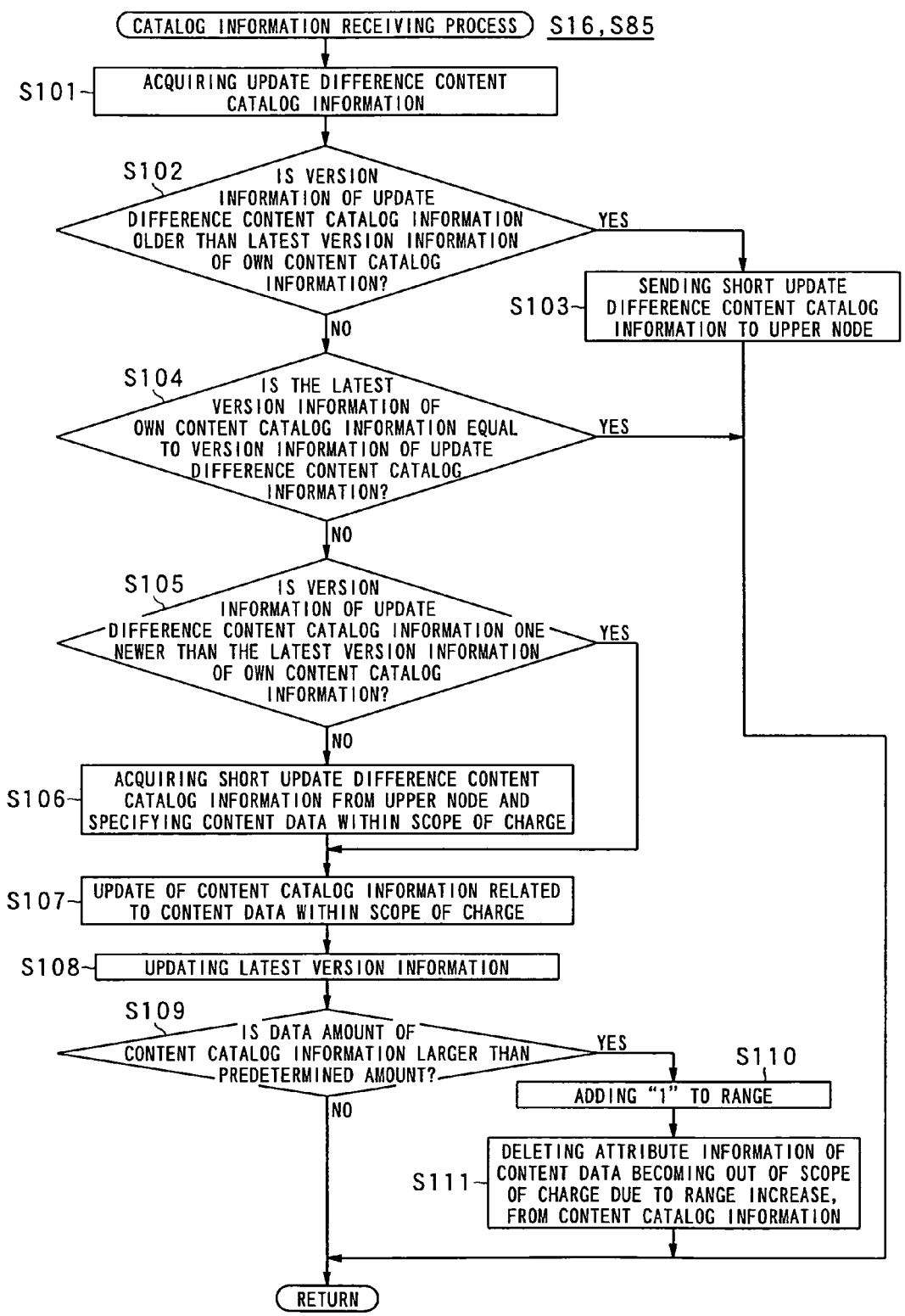
FIG. 19 is a flowchart showing a catalog information receiving process in FIG. 19 in detail.

On the other hand, the above-mentioned process shown in FIG. 15 is not applied to this embodiment 2 but the process shown in FIG. 19 is carried out instead.

In the embodiment 1, the respective nodes participating in the overlay network 9 respectively memorize all of the content catalog information. However, it is imagined that as the number of the content entered in the content delivery system S is enormous, the data amount of the content catalog information becomes too large to be memorized in a catalog cache region of one unit of node.

Then, in the embodiment 2, a scope in charge of the content data is determined with respect to each node (only the content catalog information is memorized, where the broader the scope in charge is, the larger the number of attribute information of content data is described. The narrower the scope in charge is, the less a number of attribute information of content data is described). Among the content data corresponding to the area (area in a node ID space) to which respective nodes belong (e.g. the area having the highest digit number "0" (area "0XXX") corresponding to the content data having the content ID with the highest digit number "0"), content catalog information is memorized, where the attribute information of content data of the scope in own charge is described. Therefore, it is configured such that the content catalog information is memorized and distributed among plural nodes.

Here, "scope in charge" is expressed by, for example, "Range" (an example of scope in charge information indicative of the scope in charge) indicative of the number of matching digits from the highest digit between the node ID and the content ID. For example, in a case of Range=1, it means that at least the highest digits match, in a case of Range=2, it means that at least the highest digits and the second highest digits match. The "Range" expresses that the broader the scope in charge is, the smaller the number of digits is.

Then the respective nodes memorizing the above-mentioned Range memorize the content catalog information, having attribute information of the content data with the content ID where the predetermined digit numbers of the number of digits expressed by Range matches described in it, as the content data of the scope in own charge. For example, the node having the node ID of "0132" and Range=1 memorizes the content catalog information with attribute information, having all the content data with the content ID of at least the highest digit number "0" (the highest digit matching) described in it, as the content data of the scope in own charge.

Further, the node having the node ID of "1001" and Range=2 memorizes the content catalog information with attribute information, having all the content data with the content ID of at least the highest digit and the second highest digit being "10" described in it, as the content data of the scope in own charge. Here, in a case of Range=0, all of the content catalog information is memorized. Further, the respective nodes do not prevent the content catalog information having attribute information of the content data out of the scope in own charge described in it, from being memorized. It is ensured to the other nodes that the attribute information of the content data within the minimum scope in own charge is memorized.

Further, although the respective nodes arbitrarily set Range, for example, it is set in such a way that the smaller the memory capacity of the catalog cache region is, the narrower it is (i.e. the larger the broader). Here, in a case where the memory capacity is large, it may be set up as Range=0.

Next, in reference of FIG. 19, a catalog information receiving process in a certain node will be described in detail. Here, content catalog information having at least attribute information of the content data within the scope in own charge described in it is memorized in the respective nodes participating in the overlay network 9.

In the catalog information receiving process according to the embodiment 2, as shown in FIG. 19, the control unit 11 of the node receiving the catalog delivery message acquires update difference content catalog information in the payload section of the catalog delivery message in a manner similar to the embodiment 1 (Step S101). Here, the process of Steps S102 to S105 shown in FIG. 19 is similar to the process of Steps S21 to S25 shown in FIG. 15.

Based on the comparison result of the Step S105, in a case where the version information added to the acquired update difference content catalog information is one step newer than the latest version information added to the content catalog information already memorized in the memory unit 12 of the own (Step S105: YES), the control unit 11 specifies content data within a scope in charge indicated by the own Range among the content data having attribute information described in the update difference content catalog information (e.g. content data having the content ID matching with the own node ID where the predetermined digit number of the number of matching digits (the number of the appropriate digits from the highest digit) indicated by the own Range), and updates the content catalog information related to thus specified content data (Step S107). For example, the attribute information of thus specified content data is added to and registered in the content catalog information already memorized, and the version is upgraded.

On the other hand, based on the result of the comparison in Step S105, in a case where the version information added to the acquired update difference content catalog information is not one step newer than the version information added to the content catalog information already memorized (i.e. two or more steps new) (Step S105: NO), the control unit 11 requests update difference content catalog information (i.e. shortage of update difference content catalog information) corresponding to version information to be located between both of the version information, to the upper node sending the catalog delivery message (sending a request message including the version information of the short update difference content catalog information), acquires this, and specifies content data within the scope in charge indicated by the own Range among the content data having attribute information described in the update difference content catalog information (Step S106).

Here, in a case where the upper node receiving the request of the short update difference content catalog information does not memorize the update difference catalog information due to out of the scope in own charge, the upper node requests the short update difference content catalog information to a further upper node, and the request goes up to upper nodes until the short update difference content catalog information can be acquired (at worst, the short update difference content catalog information can be acquired as long as the request goes up to a node X being a sending source of the catalog delivery message).

Then the control unit 11 specifies content data within the scope in charge indicated by the own Range (e.g. content data having the content ID matching with the own node ID where the predetermined digit number of the number of matching digits (the number of the appropriate digits from the highest digit) indicated by the own Range) among the content data having the attribute information described in the update difference content catalog thus acquired in the Step S101, and updates the content catalog information related to thus specified content data and the content data thus specified in the Step S106 (e.g. newly registering the attribute information of the specified content data) (Step S107).

Next, the control unit 11 updates the version information added to the content catalog information already memorized based on version information added to the update difference content catalog information acquired in Steps S101 (Step S108). Then the process ends.

Here, even in an event where any content data are not specified at all among content data having attribute information described in the update difference content catalog information thus acquired in the Step S101 (in other words, any content data having attribute information described in the update difference content catalog information are not in a scope in own charge), the version information added to the content catalog information already memorized is updated (made the latest) to the version information added to the update difference content catalog information acquired in the Step S101 and memorized. This is because when the update difference content catalog information is subsequently received again, it has to be compared with the version.

Next, the control unit 11 judges whether or not data amount of the content catalog information memorized in the catalog cache region in the own memory unit 12 exceeds the predetermined amount (e.g. data amount of 90% or more of the maximum capacity of the catalog cache region) (Step S109). In a case where it exceeds the predetermined amount (Step S109: YES), "1" is added to the own Range (i.e. change for narrowing the scope in own charge) (Step S110), the attribute information of the content data that becomes out of the scope in charge because of increased Range (because of narrowed scope in charge) is deleted from the content catalog information, among content data having attribute information described in the content catalog information memorized in the catalog cache (Step S111). Then the process ends. Accordingly, it is possible to secure a memory capacity of the catalog cache region. On the other hand, in a case where data amount of the content catalog information does not exceed the predetermined amount (Step S109: NO). Then the process ends.

As explained above, according to memory operation of the content catalog information in the embodiment 2, it is configured such that the scope in charge of the content data is determined with respect to every node participating in the overlay network 9 and the content catalog information having the attribute information described in the content data within the scope in own charge is memorized among content data corresponding to the area where respective nodes belong (area in the node ID space), and the content catalog information is distributed to plural nodes. Accordingly, without occurrence of the problem where the number of contents entered in the content delivery system S becomes enormous and a data amount of the content catalog information becomes too large to memorize in a catalog cache region in a unit of node, all the content catalog information are distributed and arranged on the content delivery system S in a searchable manner, so that the respective nodes utilize all of the content catalog information.

Besides, because the content data within the scope in charge of the respective nodes is set up as the content data corresponding to the content ID matching the own node ID in terms of the predetermined digit number (e.g. the highest digit), a scope in charge can be determined with respect to every entry of DHT routing table (table entry). The respective nodes can easily understand possibility of retaining the content catalog information related to what scope of content data.

Further, for example, in a case of the node ID and the content ID of 16 digits and hexadecimal number, the content catalog information can be divided into 16 of attention digits to F in level 1 of the routing table.

Further, the scope in charge of the respective nodes is specified by "Range" indicative of the number of digits necessarily matching from the highest digits between the node ID and the content ID and also indicative of a number of digits diminishing as the scope in charge is broaden. Therefore, it is possible to arbitrarily determine Range with respect to every node. Accordingly, a size (data amount) of the content catalog information to be memorized can be determined with respect to every node. For example, because the Range can be set narrower when the memory capacity of the catalog cache region is smaller, in other words, the Range can be set broader when the memory capacity of the catalog cache region is larger. Therefore, it is possible to set a data amount of the content catalog information capable of memorizing according to the memory capacity in respective nodes and appropriately distributing the content catalog information despite difference in memory capacity between nodes.

Further, in manner similar to the embodiment 1 (or the modified example of the DHT multicast process), update difference content catalog information is delivered (distributed) to all of the node participating in the overlay network 2 by the DHT multicast and the respective nodes receiving thereof incorporate only update difference content catalog information related to content data within the scope in own charge in the content catalog information already memorized and update them. Therefore, it is possible for the respective nodes to memorize the latest content catalog information within the scope in own charge.

Further, the respective nodes receiving the update difference content catalog information and memorizing appropriate one into the scope in own charge change the scope to narrow it in a case where a data amount of the content catalog information memorized in the own catalog cache region exceeds the predetermined amount. The attribute information of the content data becoming out of the scope in charge due to the narrowed scope in charge is deleted from the content catalog information among content data having attribute information described in the content catalog information memorized in the catalog cache region. Therefore, it is possible to secure a memory capacity for the catalog cache region.

3.2.2 Search Operation of Content Catalog Information

Next, search method of the content catalog information distributed and stored in the respective nodes as described above will be explained.

Figures 20A, 20B:
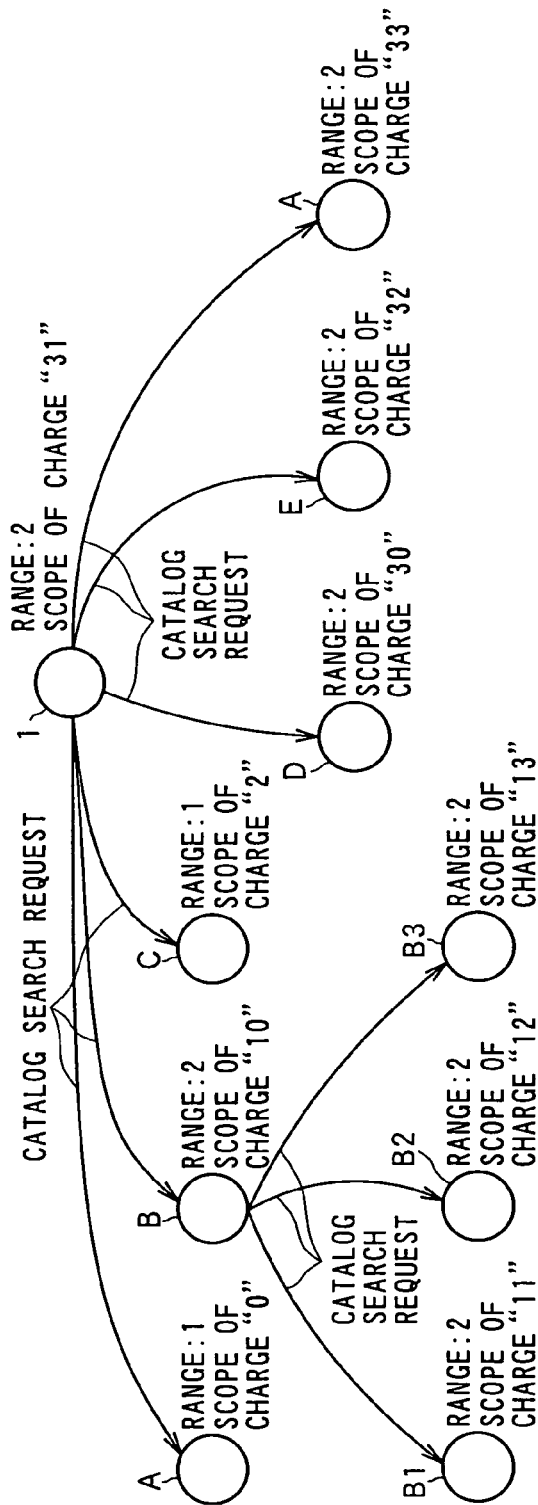
FIG. 20(A) is a view showing an example of a routing table of a node I.
FIG. 20(B) is a schematic view showing a state where a catalog search request is made from the node I.

FIG. 20(A) is a view showing an example of routing table of the node I and FIG. 20(B) is a schematic view showing a state where catalog search request is made by the node I.

In the example of FIG. 20(B), because Range of the node I is "2", the scope in charge of the node I having the node ID of "3102" is "31", the node I memorizes the content catalog information, having the attribute information of the content data, which have a content ID up to the second highest digits being "31" described in it (registered). Therefore, with respect to the attribute information of the content data having the content ID up to the second highest digit being "31", it is possible to search from the own content catalog information.

However, because the attribute information of the content data having the content ID up to the second highest digit being not "31" is not described (registered) in the own content catalog information, with respect to such the attribute information, the node I inquires to the representative node belonging to the respective areas registered in the own routing table (a catalog search request carried out with a search keyword for searching content catalog information). In other words, the node I carries out the catalog search request to the representative node belonging to the respective areas corresponding to the value of the predetermined digit number of the number of matching digits (e.g. up to the second highest digit from the highest digit) indicated by the own Range being except for "31".

In the example of FIG. 20(B), the node I carries out the catalog search request to node A, node B, and node C that are registered in first step (level 1) of the own routing table with respect to content catalog information describing the attribute information of the content data having the content ID of the highest digit number being respectively "0", "1", and "2".

Further, in the example of FIG. 20(B), the node I carries out the catalog search request to node D, node E, and node F that are registered in second step (level 2) of the own routing table with respect to content catalog information describing the attribute information of the content data having the content ID up to the second highest digit number being respectively "30", "32", and "33". In other words, in a case where the scope in own charge is a partial scope (here "31") of the content data (here, the content data having the content ID of the highest digit number "3") corresponding to the area where the own belongs, the node I carries out the catalog search request to the representative node belonging to plural small areas which the area the own belongs is further divided into.

In the example of FIG. 20(B), Range of the node B is "2" and the scope in charge of the node B having the node ID of "1001" is "10". Therefore, with respect to the attribute information of the content data having the content ID up to the second highest digit being not "10" (i.e. being "11", "12", and "13"), the node B carries out the catalog search request to node B1, node B2, and node B3 about content catalog information. In other words, in a case where the scope in own charge is a partial scope of the content data corresponding to the area the own belongs, the node B carries out (transfers) the catalog search request to the representative node belonging to plural small areas which the area the own belongs is further divided into.

Here, in a case where Range of the node I is "1", with respect to the attribute information of the content data having the content ID up to the second highest digit being "30", "32" and "33", because they are described (registered) in the content catalog information, the node does not need to carry out the catalog search request to node D, node E, and node F described (registered) in the second step (level 2) of the own routing table.

Then the respective nodes receiving the catalog search request search and acquire the content catalog information, where the attribute information of the content data is described to satisfy indicated search conditions, from the own catalog cache region, and returns a search result including thereof to the node of catalog search request source. Here, such the return may be made directly to the node of the catalog search request source or through the upper node (e.g. to node I through the node B in a case of node B1).

Next, with reference to FIGS. 21 to 23, a process in the respect nodes when the catalog search request is carried out will be described in detail.

Figure 21:
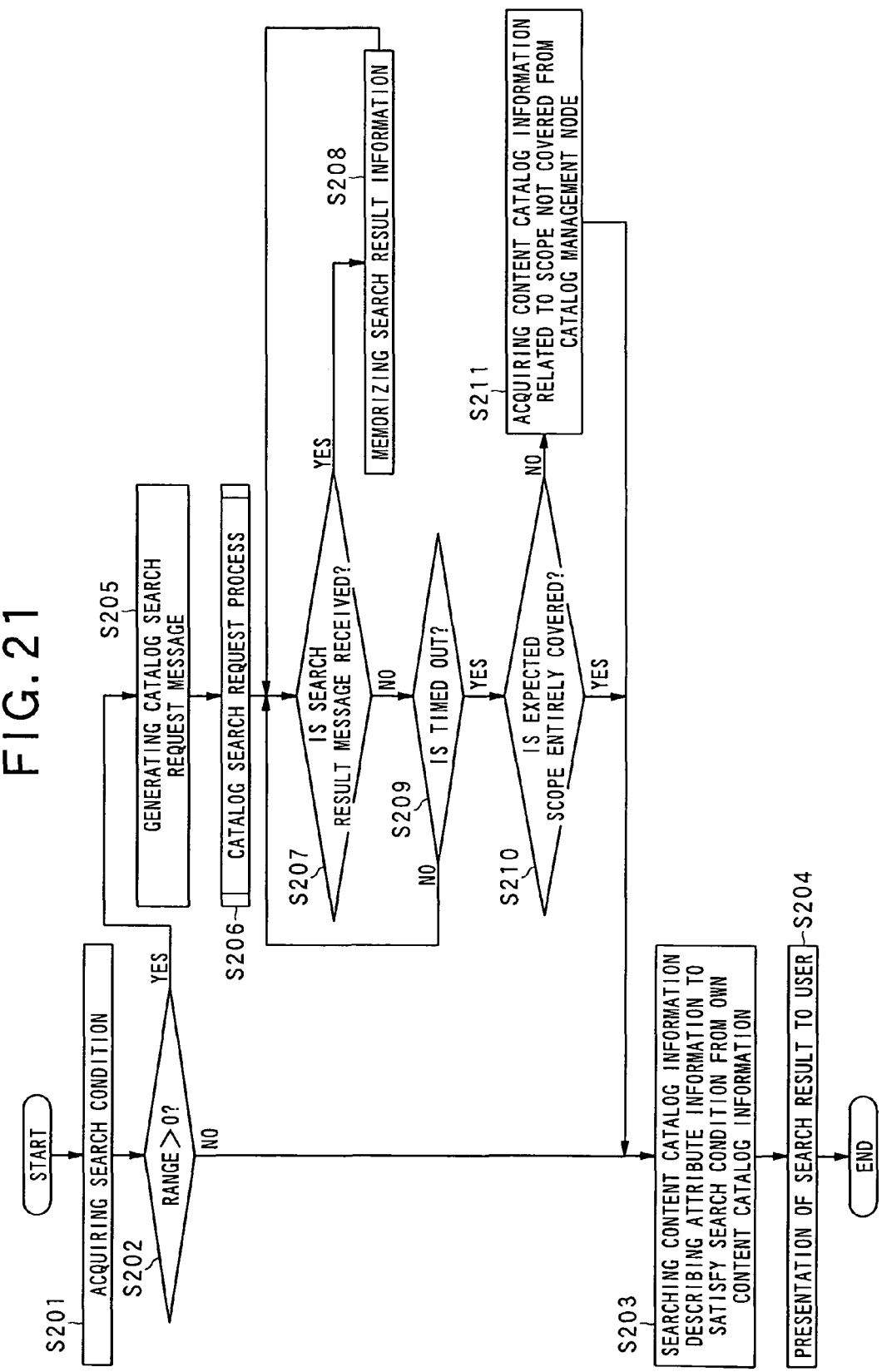
FIG. 21 is a flowchart showing a catalog search process in the node.

FIG. 21 is a flowchart showing a catalog search process in the node. FIG. 22 is a flowchart showing a catalog search request process in FIG. 21 in detail. FIG. 23 is a flowchart showing a process in the node receiving the catalog search request message.

For example, in the node I, in a case where catalog display is instructed from the user through the input unit 21, a catalog display process (not shown) starts, and for example, a catalog as shown in FIG. 5 is displayed on the display unit 16.

In such the display state, when the user operates the input unit 21 to input a desired search keyword (e.g. jazz), the catalog search process shown in FIG. 21 starts (moving from the catalog display process), the control unit 11 of the node I acquires thus inputted search keyword as search condition (Step S201), and further acquires Range from the memory unit 12.

Next, the control unit 11 judges whether or not the acquired Range is higher than "0" (Step S202). In a case where it is not higher than "0" (i.e. in a case of "0") (Step S202: NO), since all of the content catalog information is memorized, the control unit 11 searches and acquires the content catalog information, where the attribute information corresponding to thus acquired search keyword is described, from the content catalog information memorized in the own catalog cache region (Step S203), displays a list of the attribute information described in the content catalog information (e.g. genre list) on the catalog displayed on, for example, the display unit 21 (presenting the search result to the user) so as to be selectable (Step S204). Then the process ends and returns to the catalog display process. Here, in the catalog display process, when the user inputs the search keyword again (e.g. refining by artist names), the catalog search process starts again. Then when the content name is selected on the catalog displayed in the display unit 21, the content ID of the content data is acquired as described above, and a content location inquiry message including the content ID is sent to the root node.

On the other hand, in a case where the acquired Range is higher than "0" (i.e. in a case where content catalog information is not memorized at all) (Step S202: YES), the control unit 11 generates the catalog search request message as search request information, which includes the header section where the own IP address or the like is included, and for example, a level lower limit value is set to lower=1, a level upper limit value to upper=2, a transfer frequency upper limit value to nforward=2; and the payload section that includes the particular unique ID (e.g. ID particular to the catalog search request message) and the acquired search keyword as a search condition (Step S205). The scope of sending a message in the routing table can be defined by the level lower limit value lower and the level upper limit value upper. For example. Provided that there are set up as the level lower limit value of lower=1 and the level upper limit value of upper=2, all the nodes registered in level 1 and level 2 of the routing table become a message sending destination.

Next, the control unit 11 carries out a catalog search request process (Step S206).

Figure 22:
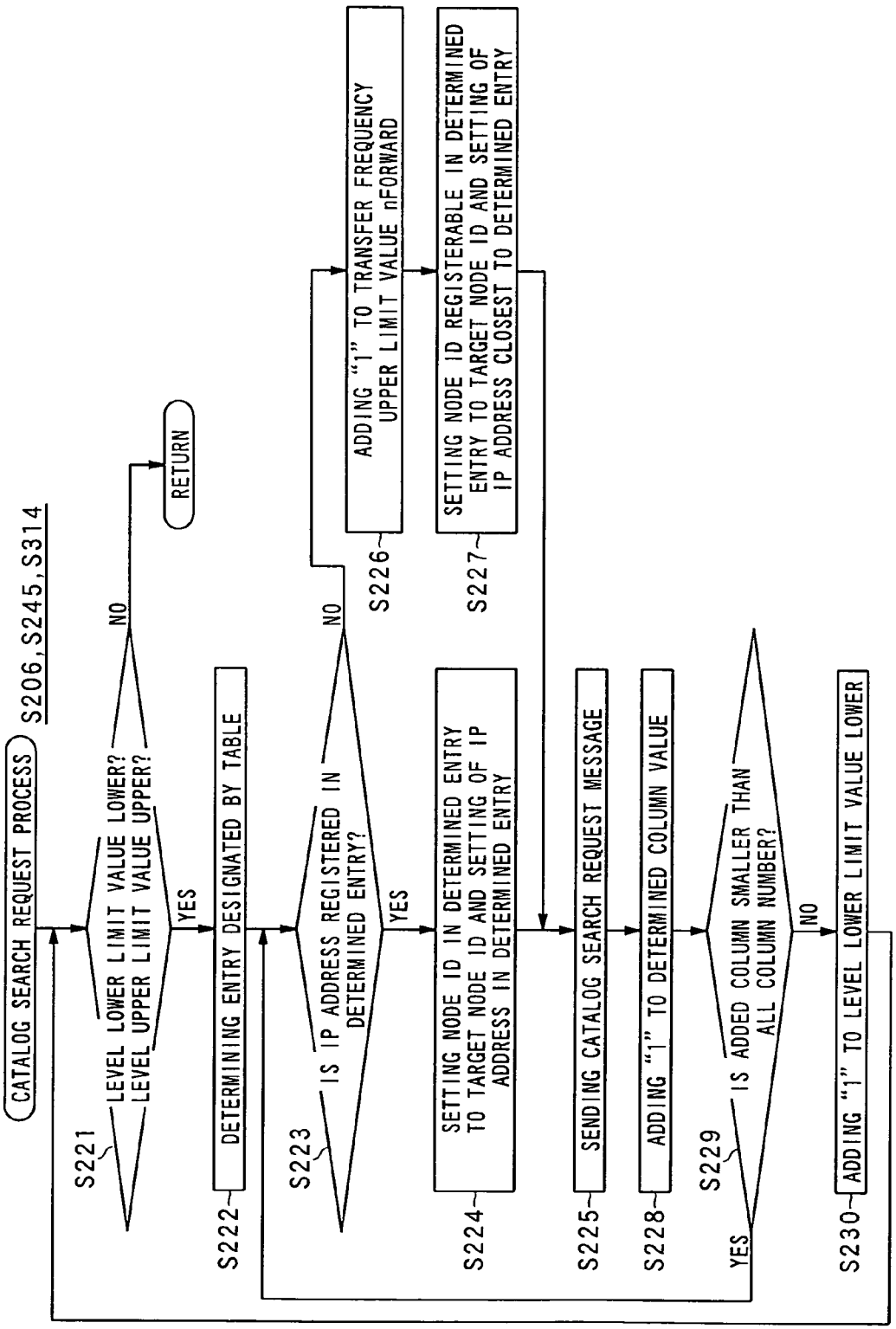
FIG. 22 is a flowchart showing a catalog search request process in FIG. 21 in detail.

In the catalog search request process, as shown in FIG. 22, first the control unit 11 judges whether or not the level upper limit value upper set in the header section in the catalog search request message is higher than the level lower limit value lower (Step S221). In a case where it is higher than the level lower limit value lower (Step S221: YES), the control unit 11 determines the entry designated in the own routing table (i.e. level and column) (Step S222). More particularly, the control unit 11 determines a designated level in the level lower limit value lower in the catalog search request message and determines a designated column in a line from left end of the level.

Next, the control unit 11 judges whether or not the IP address is registered in the determined entry (Step S223). In a case where it is registered (Step S223: YES), the control unit 11 sets to the node ID in thus determined entry as the target node ID in the header section of the catalog search request message, sets the IP address up in the determined entry (Step S224), and sends the catalog search request message to the representative node registered in thus determined entry (Step S225).

On the other hand, in a case where the IP address is not registered in the determined entry (Step S223: NO), the control unit 11 adds "1" to the transfer frequency upper limit value nforward (in order to increase the transfer frequency upper limit value to reach the node belonging to the area) (Step S226), sets to the arbitrary node ID enabled to register (for example, in a case of area where the attention digit is "0", any other value may be available as long as it starts from 0 (highest digit)) in the determined entry as the target node ID in the header section of the catalog search request message, sets the IP address of the node registered (memorized) in the closest entry (e.g. in right hand neighbor entry) in the same level as that of the determined entry (Step S227), and sends the catalog search request message to the node registered in the closest entry. Accordingly, the message is finally transferred to the node of the arbitrary node ID enabled to register in the determined entry (representative node belonging to this area) or discarded after reaching the transfer frequency upper limit value.

Next, the control unit 11 adds "1" to the determined column value (Step S228) and judges whether or not thus added column is lower than the numbers of all columns (Step S229). In a case where it is lower than the number of all columns (Step S229: YES), the control unit 11 returns to Step S223, carries out the similar process to the above process, and repeats the process with respect to the entry of right end column in the level until the process ends.

Then, in a case where it becomes not lower than the number of all columns (Step S229: NO), "1" is added to the level lower limit value lower (Step S230), the control unit 11 returns to Step S221, again judges whether or not the level upper limit value upper is higher than the level lower limit value lower thus added, and repeats the process until it is not higher than thus added level lower limit value lower. In other words, processes are carried out with respect to the respective entries in the level (level 2 here) of the routing table indicated by the level upper limit value upper. Then when the level upper limit value upper becomes not higher than the level lower limit value lower (Step S221: NO), the control unit 11 returns to the process shown in FIG. 21.

Thus, the catalog search request message is sent to the representative node belonging to respective areas according to the IP address of the representative node belonging to respective areas in the routing table.

Figure 23:
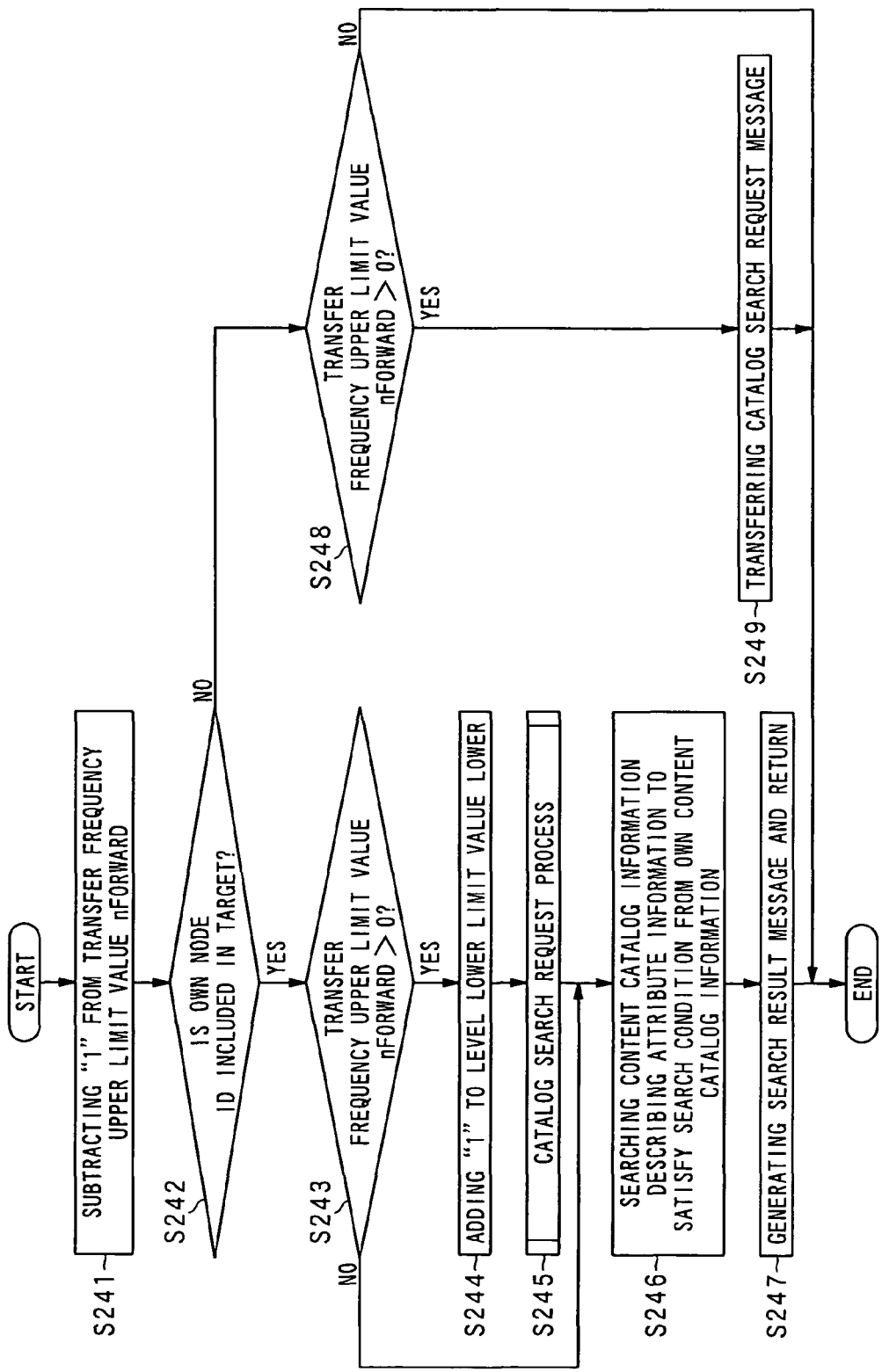
FIG. 23 is a flowchart showing a process in the node receiving the catalog search request message.

Next, the respective nodes receiving the catalog search request message thus sent temporarily store the catalog search request message and starts a process shown in FIG. 23.

When there starts the process shown in FIG. 23, the control unit 11 subtracts "1" from the transfer frequency upper limit value nforward in the header section of the catalog search request message (Step S241), and judges whether or not the own node ID is included in the target of received catalog search request message (Step S242). For example, in a case where the own node ID matches with the target node ID in the header section of the catalog search request message, it is judged that the target (Step S242: YES) includes it, and the control unit 11 judges whether or not thus subtracted transfer frequency upper limit value nforward is higher than "0" (Step S243).

Then, in a case where the transfer frequency upper limit value nforward is higher than "0" (Step S243: YES), the control unit 11 adds "1" to level lower limit value lower (Step S244), carries out the catalog search request process shown in FIG. 22 (Step S245), and moves to Step S246. The catalog search request process is as described above, and the node transfers the catalog search request message to the own lower node (the representative node registered in the respective entries in level 2 of the routing table).

On the other hand, in a case where the transfer frequency upper limit value nforward is not higher than "0" (becomes "0") (Step S243: NO), the control unit 11 does not transfer the catalog search request message any longer and moves to Step S246.

In Step S246, the control unit 11 acquires the search keyword as a search condition in the payload section of the catalog search request message, and searches the content catalog information, having the attribute information of the content data to satisfy the search condition (e.g. content data corresponding to a keyword "jazz") described in it, from the own catalog cache region.

Then, the control unit 11 generates the search result message including thus searched content catalog information, search result information including the scope in own charge (e.g. "10") as a search scope, and the unique ID in the catalog search request message, and sends (returns) this to the node I of a sending source of the catalog search request message (Step S247), and the process is finished.

On the other hand, in the process of Step S242, in a case where it is judged that the own node ID is not included in the target of the received catalog search request message (Step S242: NO), the control unit 11 judges whether or not thus subtracted transfer frequency upper limit value nforward is higher than "0" (Step S248). In a case where it is higher than "0" (Step S248: YES), the control unit 11 acquires the node IP address or the like having the node ID closest to the target ID in the header section of the catalog search request message (e.g. upper digits match the most), in a similar manner to the ordinary DHT routing, transfers the catalog search request message addressed to the IP address or the like (Step S249), and finishes the process in a case where it is not higher than "0" (Step S248: NO).

Then when returning to the process shown in FIG. 21 and receiving the search result message returned from the other node (Step S207: YES), the control unit 11 of the node I temporarily memorizes the unique ID included in the message and the search result information in RAM (Step S208). Thus the control unit 11 repeats receive-waiting and receiving the search result message, until preset time (time that is preset after sending the catalog search request message in the catalog search request process) passes to reach timeout, and memorizes the unique ID and search result information that are included in the respective search result messages thus received.

Then when reaching timeout (Step S209: YES), the control unit 11 collects and organizes the search result information corresponding to the same unique ID, and judges whether or not the search scope included therein entirely covers expected scopes (scope out of the scope in own charge) (i.e. judging whether or not there is a scope where the content catalog information is not searched, based on the search scope included in all of the received search result information) (Step S210). In a case where it does not cover (there is a scope that is not searched) (Step S210: NO), the control unit 11 inquires only the scope not covered to the node X being the catalog management node or the catalog management server, and acquires and adds the content catalog information, having the attribute information of the content data to satisfy the search condition related to the scope described in it (Step S211).

Next, the control unit 11 of the node I searches and acquires the content catalog information, having the attribute information of the content data satisfying the search condition (e.g. corresponding to the search keyword "jazz") described in it, from the content catalog information, having the attribute information of the content data in the scope of the own charge, from the own catalog cache region (Step S203). Accordingly, the control unit 11 displays (presenting the search result to the user) a list of the attribute information described in the content catalog information covering the entire scope on the catalog displayed on, for example, the display unit 21 (Step S204) so as to be selectable. Then the process ends and returns to the catalog display process.

Thus, as explained above, according to the search operation of the content catalog information in the embodiment 2, the respective nodes can efficiently carry out the catalog search request (catalog search request message) with respect to the content catalog information related to the content data out of the scope in own charge by DHT multicast to the representative node registered in respective entries each of, for example, level 1 and level 2 of the own DHT routing table. Therefore, it is possible for the respective nodes to efficiently search desired content catalog information with small message amount.

Then the node making the catalog search request can acquire the search result in respective scopes from the respective representative nodes. Therefore, there is no need to retain all of the content catalog information.

Further, a load of the search process on the respective nodes receiving the catalog search request becomes large when a size of the content catalog information becomes huge. According to the method of Embodiment 2, content catalog information is distributed almost evenly (because the content ID itself being distributed not spaced away so much in the node ID space). Therefore, the load of the search process in the respective nodes is evenly distributed to thereby improve search speed and the network load can be distributed.

Further, because the content catalog information is autonomously distributed by the respective nodes, information collection and management by, for example, the server are not necessary. In other words, the manager only delivers, for example, the difference update content catalog information from the catalog management node by DHT multicast, judges whether or not the respective nodes are in the scope in own charge by the node ID, the content ID, and Range, and memorizes and stores only the content catalog information related to the content data in the scope in own charge. Therefore, the content catalog information can be autonomously distributed.

(Modified Example of Catalog Search Process)

In the catalog search process shown in FIGS. 21 and 22 as mentioned above, the node receiving the catalog search request message confirms the transfer frequency upper limit value nforward regardless of the scope in own charge and the catalog search request message is transferred to the lower node. However, in this modified example, only in a case where the scope in own charge is a portion of the scope of the content data corresponding to the area to which the own belongs, the node receiving the catalog search request message transfers the catalog search request message to the representative node belonging to a small area, to which the area the own node belongs is further divided into plural areas. The modified example will be described with reference to FIGS. 24 to 26.

Here, with respect to the portion similar to the above-mentioned embodiment 2 in this modified example, duplicated explanation is omitted.

The process shown in FIG. 22 mentioned above is also applied to this modified example and carried out in a manner similar to embodiment 2.

Figure 24:
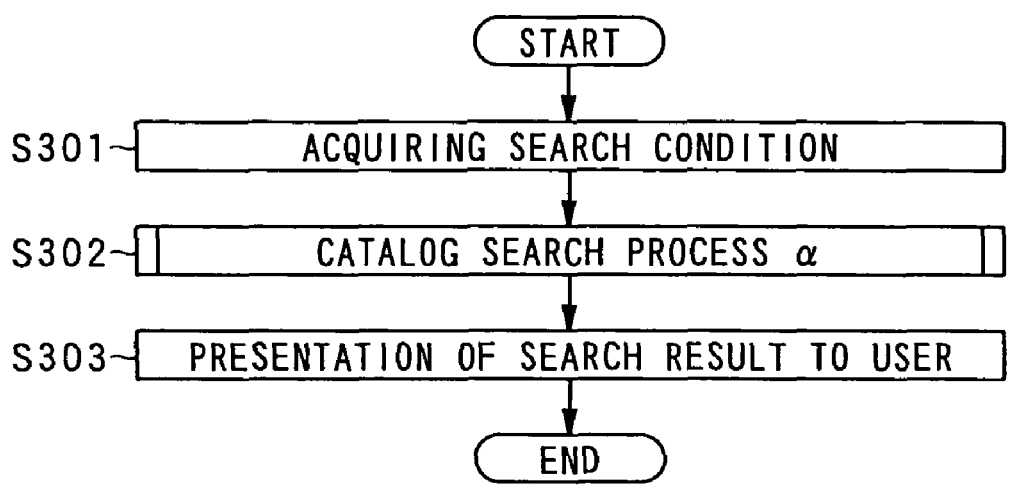
FIG. 24 is a flowchart showing a catalog search process in the node.
Figure 25:
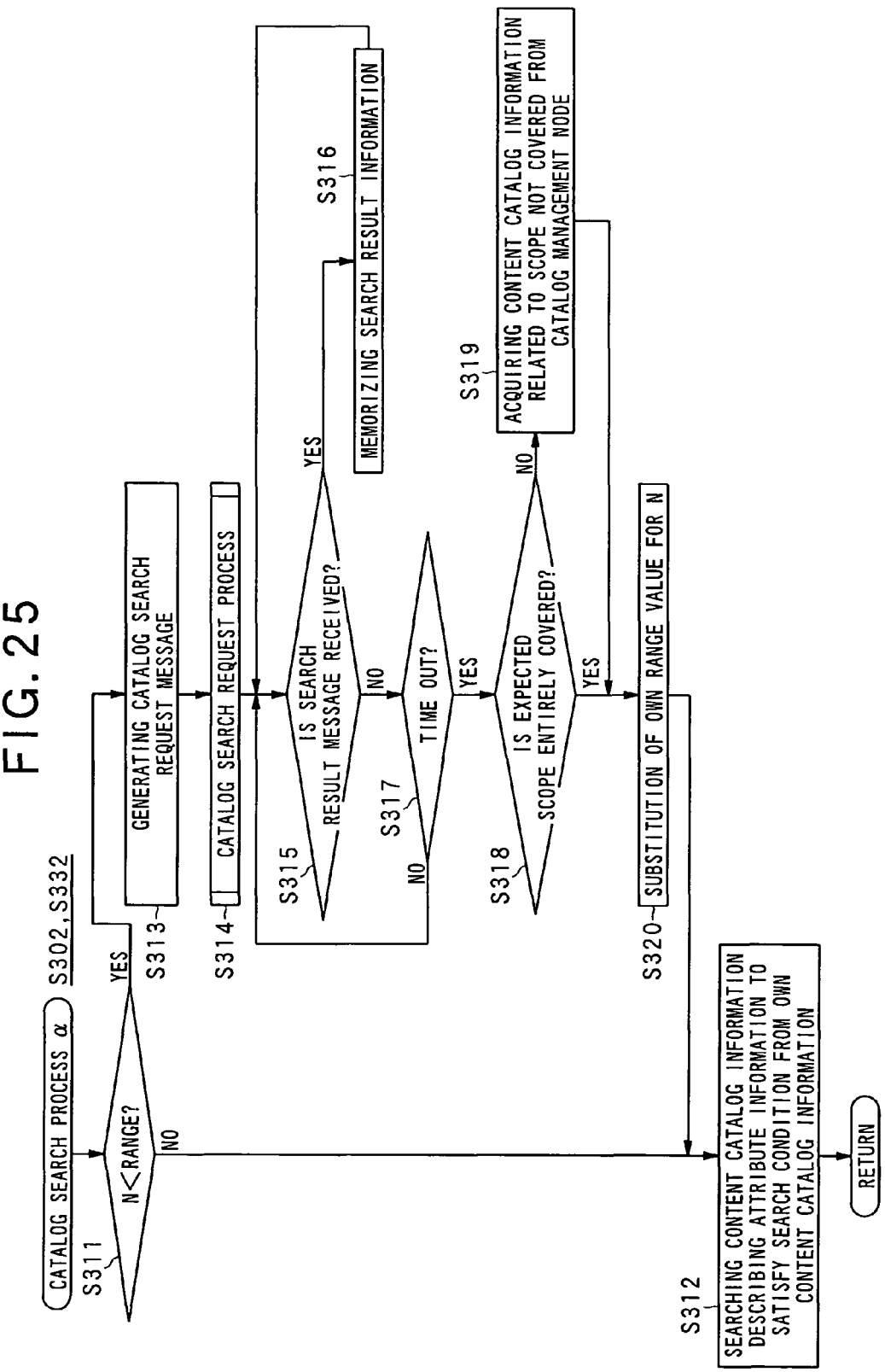
FIG. 25 is a flowchart showing a catalog search process α in the node.
Figure 26:
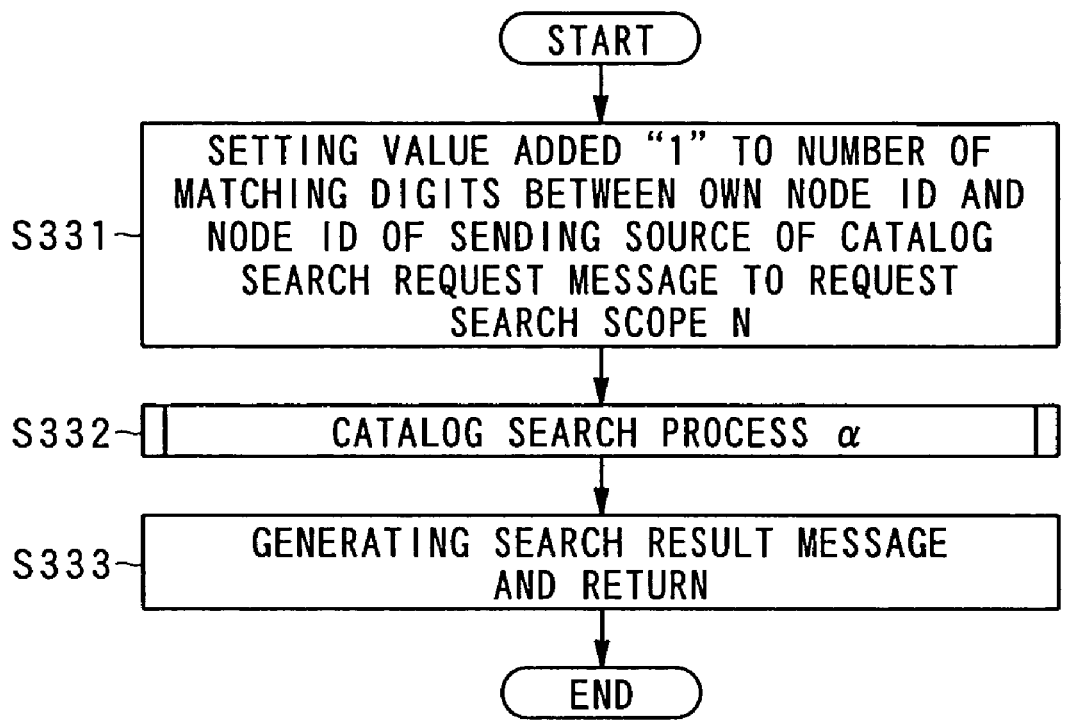
FIG. 26 is a flowchart showing a process in the node receiving the catalog search request message.

On the other hand, the process shown in FIG. 21 as mentioned above is not applied to this modified example. The process shown in FIGS. 24 and 25 is carried out instead. Further, the process shown in FIG. 23 mentioned above is not applied to this modified example either, but the process shown in FIG. 26 is carried out instead.

(Process of Node I)

In a manner similar to the process shown in FIG. 21, the catalog search process shown in FIG. 24 starts (moves from the catalog display process) when the user operates the input unit 21 to input the search keyword (e.g. jazz) in a state where the catalog, for example, as shown in FIG. 5 displayed on the display unit 16. The control unit 11 of the node I acquires thus inputted search keyword as a search condition (Step S301), and further acquires Range from the memory unit 12.

Next, the control unit 11 moves to catalog search process a shown in FIG. 25 (Step S302).

As sown in FIG. 25, in the catalog search process a the control unit 11 of the node I first judges whether or not thus acquired own Range is larger than "request search scope N" previously set by the user through the input unit 21 (Step S311).

Here, the request search scope N is to determine a scope of searching the content data. When it is set to, for example, "0", the entire scope of the content data is subject to search, and the search scope becomes narrow when the value becomes large.

Then, in a case where the own Range is not larger than the request search scope N (e.g. Range=0, request search scope N=0) (Step S311: NO), from the attribute information of the content data having the content ID having N digits from the highest digit that matches those of the own node ID (request search scope) (in a case of request search scope=0, all digits do not necessarily match, and therefore the subject becomes content IDs of all content data) among the content IDs of the content data describing the attribute information in the own content catalog information, the control unit 11 searches and acquires the content catalog information having the attribute information corresponding to thus acquired search keyword described in it, from the content catalog information memorized in the own catalog cache region (Step S312). Then the control unit 11 returns to the process shown in FIG. 24, displays (presenting the search result to the user) a list of the attribute information on, for example, the catalog displayed in the display unit 21 (Step S303) so as to be selectable. Then the process ends and returns to the catalog display process in a similar manner to the process shown in FIG. 21.

On the other hand, in a case where the own Range is larger than the request search scope N (e.g. Range=2, request search scope N=0) (Step S311: YES), the control unit 11 generates the catalog search request message as search request information, which includes the header section where the own IP address or the like is included, and for example, a level lower limit value lower is set up as "request search scope N+1", a level upper limit value upper to "own Range", a transfer frequency upper limit value nforward to 1; and the payload section that includes the unique ID and the acquired search keyword as a search condition (Step S313).

As described above, since the scope of sending a message in the routing table can be defined by the level lower limit value lower and the level upper limit value upper, for example, in a case of Range=2 and request search scope N=0, for example, the level lower limit value lower=1, the level upper limit value upper=2, and all the nodes registered in level 1 and level 2 of the routing table (nodes A, B, C, D, E, and F in an example of FIG. 20) become a message sending destination. Further, for example, in a case of Range=2 and request search scope N=1, for example, the level lower limit value lower=2, the level upper limit is upper=2, and all the nodes registered only in level 2 of the routing table become a message sending destination.

Next, the control unit 11 carries out a catalog search request process shown in FIG. 22 (Step S314). In such the catalog search request process, the catalog search request message is sent to the representative node in the respective areas according to the IP address of the representative node belonging to representative areas in the routing table in similar manner to the embodiment 2.

Then, the respective nodes receiving the sent catalog search request message temporarily store the catalog search request message and start the process shown in FIG. 26.

When the process shown in FIG. 26 starts, the control unit 11 of the node adds "1" to the number of matching digits (the number of matching digits from the highest digit) between the node ID of the node I being a sending source of the catalog search request message and the own node ID to set the value as a request search scope N (Step S331), acquires the search keyword in the catalog search request message as a search condition, further acquires the own Range from the memory unit 12, and moves to the catalog search process a shown in FIG. 25 (Step S332).

(Process of Node A)

In a case where the node receiving the catalog search request message is, for example, the node A shown in FIG. 20, in Step S311 in the catalog search process a shown in FIG. 25, since the own Range (=1) is not larger than the request search scope N (=1), the process moves to Step S312. Then, from the attribute information of the content data having the content ID (i.e. the content ID being the highest digit number of "0") having N (=1) digits from the highest digit that match those of the own node ID (0132), among the content IDs of the content data describing the attribute information in the own content catalog information, the control unit 11 of the node A searches and acquires the content catalog information, having the attribute information corresponding to thus acquired search keyword described in it, from the content catalog information memorized in the own catalog cache region, and returns to the process shown in FIG. 26.

Then, the control unit 11 of the node A generates the search result message including thus searched content catalog information in the Step S312, search result information including the scope in own charge (e.g. "0") as a search scope, and the unique ID in the catalog search request message, and sends (returns) this to the node I of a sending source of the catalog search request message. Then the process ends.
(Process of Node B or the Like)

On the other hand, in a case where the node receiving the catalog search request message is, for example, a node B shown in FIG. 20, in Step S311 in the catalog search process a shown in FIG. 25, since the own Range (=2) is larger than the request search scope N (=1), the control unit 11 moves to Step S313. The control unit 11 of the node B generates the catalog search request message as search request information, which includes the header section where the own IP address or the like is included, and for example, a level lower limit value lower is set up as "request search scope N (=1)+1", a level upper limit value upper to "own Range (=2)", and a transfer frequency upper limit value to nforward=1; and the payload section that includes the particular unique ID and the acquired search keyword as a search condition. Here, the level lower limit value lower is 2, and the level upper limit value upper is 2, and nodes B1, B2, and B3 registered in level 2 of the routing table become a message sending destination.

Then the control unit 11 of the node B carries out the catalog search request process shown in FIG. 22 and sends the catalog search request message to the nodes B1, B2, and B3. Then the nodes B1, B2, and B3 thus receiving the catalog search request message carry out the process shown in FIG. 26 (through the process of FIG. 25 similarly to that of the above-mentioned node A). The control unit 11 generates the search result message including the content catalog information the control unit 11 searches and acquires itself, the search result information including the scope in own charge as the search scope, and the unique ID in the catalog search request message, sends (returns) this to the node B being a sending source of the catalog search request message, and finishes the process.

When returning to the process carried out by the node B as shown in FIG. 25, receiving the search result messages respectively returned from the nodes B1, B2, and B3 (ideally returned from all of the nodes B1, B2, and B3, but it is considered that they are not returned due to withdrawal or the like) (Step S315: YES), the control unit 11 of the node B temporarily memorizes the unique IDs included in the respective messages and the search result information in RAM (Step S316). Thus, the control unit 11 repeats receipt-waiting and receiving the search result message, until the preset time (time that is preset after sending the catalog search request message in the catalog search request process) passes to reach timeout, and memorizes the unique ID and search result information that are included in the respective search result messages thus received.

Then when reaching timeout (Step S317: YES), the control unit 11 of the node B collects and organizes the search result information corresponding to the same unique ID, and judges whether or not the search scope included therein entirely covers expected scopes (scope out of the scope in own charge ("11", "12", and "13" here) (Step S318). In a case where it does not cover (Step S318: NO), the control unit 11 inquires only the scope not covered to the node X being the catalog management node or the catalog management server, and acquires and adds the content catalog information where the attribute information of the content data to satisfy the search condition related to the scope is described (Step S319).

Next, the control unit 11 of the node B sets a value of the own Range (=2) up as request search scope N (substituting to convert N) (Step S320), searches and acquires the content catalog information having the attribute information corresponding to thus acquired search keyword is described in it, from the content catalog information memorized in the own catalog cache region, from the attribute information of the content data having the content ID (i.e. the content ID being the highest digit number of "10") having N (=2) digits from the highest digit that match those of the own node ID (1001), among the content IDs of the content data describing the attribute information in the own content catalog information (Step S312), and returns to the process shown in FIG. 26.

Then, in Step S333 shown in FIG. 26, the control unit 11 of the node B generates the content catalog information thus acquired in the Steps S316, S319, and S312, the search result information including all of the search scopes including the scope in own charge (here "10", "11", "12", and "13", in other words "1"), and the unique ID in the catalog search request message, and sends (returns) this to the node I of a sending source of the catalog search request message. Then the process ends.
(Process of Node I)

When returning to the process carried out by the node I as shown in FIG. 25, receiving the search result messages respectively returned from the nodes A, B, and others (Step S315: YES), the control unit 11 of the node I temporarily memorizes the unique IDs included in the respective messages and the search result information in RAM (Step S316). Thus, the control unit 11 repeats receipt-waiting and receiving the search result message, until the preset time (time that is preset after sending the catalog search request message in the catalog search request process) passes to reach timeout, and memorizes the unique ID and search result information that are included in the respective search result messages thus received.

Then when reaching timeout (Step S317: YES), the control unit 11 of the node I collects and organizes the search result information corresponding to the same unique ID, and judges whether or not the search scope included therein entirely covers expected scopes (scope out of the scope in own charge (e.g. "0", "1", "2", "30", "32", and "33" here) (Step S318). In a case where it does not cover (Step S318: NO), the control unit 11 inquires only the scope not covered to the node X being the catalog management node or the catalog management server, and acquires and adds the content catalog information, having the attribute information of the content data to satisfy the search condition related to the scope described in it (Step S319).

Next, the control unit 11 of the node I sets a value of the own Range up as request search scope N (e.g. substituting to convert N to "2") (Step S320), searches and acquires the content catalog information, having the attribute information corresponding to thus acquired search keyword described in it, from the content catalog information memorized in the own catalog cache region, from the attribute information of the content data having the content ID (e.g. in case of N=2, the content ID having two digits from the highest digit of "31") having N digits from the highest digit that match those of the own node ID (3102), among the content IDs of the content data describing the attribute information in the own content catalog information (Step S312). Then the process returns to that shown in FIG. 24.

Then in Step S303 shown in FIG. 24, the control unit 11 displays (presenting the search result to the user) a list of the attribute information, for example, on the catalog displayed in the display unit 21 (Step S303) so as to be selectable, finishes the process, and returns to the catalog display process in a similar manner to the process shown in FIG. 21.

As explained above, according to the modified example of the above catalog search process, the node receiving the catalog search request (catalog search request message) carries out the catalog search request to the lower node (i.e. the representative node belonging to small area, where the area the own belongs is further divided into plural areas) with respect to the content catalog information related to the content data out of the scope of the own charge, acquires the search result from those nodes and returns this together with the search result of the own scope to a node being a catalog search request source. Therefore, it is possible to return the search result efficiently and securely.

It is possible to reduce the network load in comparison with the catalog search process shown in FIGS. 21 and 22, wherein the node receiving the catalog search request transferring the catalog search request to the lower node regardless of the scope of the own charge.

Needless to say that the above-described catalog search process is applicable to not only the mode that the content catalog information is delivered and memorized by DHT multicast, but also to the mode that content catalog information is previously distributed and arranged to the plurality of nodes (e.g. content catalog information of the scope in own charge is memorized at the time of delivery of respective nodes).

Further, in respective nodes in the above embodiments, nodes close to the own network (having a smaller HOP number) may be given priority and registered in respective entries of the own DHT routing table in terms of locality.

For example, a certain node sends a confirmation message to plural nodes enabled to register in a certain entry in the own routing table, acquires, for example, TTL (Time To Live) between the respective nodes and the own from a return message returned from the respective nodes for comparison (in a case where TTL is already known, it is unnecessary to send the confirmation message), nodes close to the own in terms of the network are given priority and registered in the own DHT routing table.

According to such the configuration, respective nodes carry out the catalog search request to the node close to the network. Therefore, it is possible to reflect locality in the search process and further reduce the network load.

Further, although the above-described embodiment is applied to the content catalog information being common information commonly used in plural nodes in the content delivery system S, it may be applied to other common information.

Further, although in the above-described embodiment, the explanation is made on the premise of the overlay network 9 configured by algorithm using DHT, the present invention is not limited thereto.

The present invention is not confined to the configuration listed in the foregoing embodiments, but it is easily understood that the person skilled in the art can modify such configurations into various other modes, within the scope of the present invention described in the claims.

What is claimed is:

1. A node device comprising a processor and the node device in an information communication system that includes a plurality of node devices which are mutually communicable through a network, a plurality of content catalogue information being dispersed and stored in the plurality of the node devices in the information communication system, the content catalogue information being for searching content data, and the content data being able to be acquired in the information communication system, the node device comprising:

a memory unit which memorizes at least a part of the plurality of the content catalogue information, the part of the plurality of the content catalogue information being content catalogue information of a charge scope of the node device comprising the memory unit;

a first sending unit which sends to at least any of the plurality of the node devices search request information including search conditions for searching content catalog information;

a first receiving unit which receives the search request information sent by the first sending unit included in another node device;

a determining unit configured to determine whether the content catalogue information requested in the search request information received by the first receiving unit is memorized in the memory unit; and a second sending unit which sends, in response to determining the content catalogue information requested in the search request information received by the first receiving unit is memorized in the memory unit, the content catalogue information requested in the search request information to the another node device that sent the search request information;

wherein, in the information communication system, the content data corresponds to content identification information being unique identification information and the node devices included in the information communication system correspond to node identification information, wherein the memory unit memorizes, as the content catalogue information of the charge scope of the node device comprising the memory unit, the content catalogue information for searching the content data corresponding to the content identification information of which predetermined digits match those of the node identification information corresponding to the node device comprising the memory unit, wherein, in the node device, address information of a representative node device is memorized, the address information indicating an address of another node device connected to the node device, and wherein the representative node device is at least one of the node devices of which the address information is memorized, and the node device further comprising:

a charge scope information memory unit which memorizes charge scope information indicative of a digit-number of the node identification information corresponding to the node device comprising the memory unit, the digit-number corresponding to the charge scope of the node device, and the digit-number which becomes smaller as the charge scope becomes large;

wherein the memory unit memorizes the content catalog information for searching the content data corresponding to the content identification information of which a value of the number of digits matches the value of the number of digits of the node identification information corresponding to the node device comprising the memory unit, and wherein the first sending unit sends the search request information to the representative node device in accordance with the address information of the representative node device, the value of the address information of the representative node device corresponding to a value different from the value of the digits of the matching digit-number indicated by the charge scope information.

2. The node device according to claim 1, wherein, in the information communication system, an overlay network is constructed by the plurality of the node devices;

the node device comprising an address information memory unit which memorizes a routing table including the address information indicating the address of the another node device connected to the node device via the overlay network;

wherein the first sending unit sends the search request information to the representative node device of which the address information is memorized in the address information memory unit; and the node device comprising a second receiving unit which receives the content catalogue information requested in the search request information sent by the first sending unit.

3. The node device according to claim 1, wherein charge scope information indicative of the charge scope of the other node devices is sent, with the content catalogue information, by the second sending unit included in the other node devices, the node devices comprising:

a scope determining unit configured to determine whether there exists a scope where the content catalog information is not searched based on all of the sent charge scope; and a shortage scope acquisition unit configured to acquire the content catalog information corresponding to a not-yet-searched scope from the device managing the content catalog information, in a case where the not-yet-searched scope exists.

4. The node device being the representative node device that receives the search request information sent from the node devices according to claim 2, the node device, comprising:

a charge scope information memory unit which memorizes charge scope information indicative of the charge scope of the node device being the representative node device;

wherein the memory unit memorizes the content catalog information for searching the content data in the scope of the charge scope indicated by the charge scope information memorized in the charge scope information memory unit; and the node device comprising:

a content catalog information acquisition unit configured to search and acquire the content catalog information for searching the content data to satisfy the search condition included in the search request information sent by the first sending unit from the memory unit; and a search result information return unit which returns the search result information including the acquired content catalog information to the node devices sending the search request information.

5. The node device according to claim 4, wherein, in the overlay network, the plurality of the node devices are divided into a plurality of groups based on node identification information identifying the node device in the overlay network, and wherein the address information memory unit memorizes the routing table including address information indicating an address of the representative node devices belonging to a plurality of sub groups obtained by further dividing the group to which the node device comprising the address information memory unit belongs, the node device comprising:

a search request information transfer unit which transfers the search request information to the representative node device belonging to the sub groups in accordance with the address information of the representative node device belonging to the sub groups.

6. The node device according to claim 5, wherein the search request information transfer unit transfers the search request information to the representative node device belonging to the sub groups in a case where the charge scope indicated in the charge scope information memorized in the charge scope information memory unit is a part of the charge scope of the content data corresponding to the sub groups to which the node device belongs.

7. The node device according to claim 5, wherein the second receiving unit receives the content catalog information returned from the node devices belonging to the sub groups to which the search request information is transferred, and wherein the second sending unit sends the content catalog information acquired by the content catalog information acquisition unit and the content catalog information received by the second receiving unit to the node device sending the search request information.

8. The node device according to claim 2, wherein, in the overlay network, the plurality of the node devices are divided into a plurality of groups based on node identification information identifying the node device in the overlay network, and wherein the address information memory unit memorizes the routing table including address information indicating an address of the representative node devices belonging to a plurality of sub groups obtained by further dividing the group to which the node device comprising the address information memory unit belongs, the node device comprising:

a charge scope information memory unit which memorizes charge scope information indicative of the charge scope of the node device;

a content catalog information sending unit which sends the content catalog information received by the second receiving unit to the representative node device belonging to the sub groups, in accordance with the address information of the representative node device belonging to the sub groups;

a content specifying unit configured to specify the content data in the charge scope indicated by the charge scope information among the content data searched with the content catalog information received by the second receiving unit; and wherein the memory unit memorizes at least content catalog information for searching the content data specified by the content specifying unit.

9. The node device according to claim 4, wherein, in the overlay network, the plurality of the node devices are divided into a plurality of groups based on node identification information identifying the node device in the overlay network; and wherein the address information memory unit memorizes the routing table including address information indicating an address of the representative node devices belonging to a plurality of sub groups obtained by further dividing the group to which the node device comprising the address information memory unit belongs, the node device comprising:

a content catalog information sending unit which sends the content catalog information received by the second receiving unit to the representative node device belonging to the sub groups in accordance with the address information of the representative node device belonging to the sub groups, a content specifying unit configured to specify the content data in the charge scope indicated by the charge scope information among the content data searched with the content catalog information received by the second receiving unit; and wherein the memory unit memorizes at least content catalog information for searching the content data specified by the content specifying unit.

10. The node device according to claim 8, wherein in the content catalog information, an updated difference content catalog information is sent every time when the content catalog information memorized in the other node device is updated;

wherein the second receiving unit receives the content catalog information related to the update, which is sent from the other node device;

wherein the content catalog information sending unit sends the received content catalog information related to the update to the representative node device belonging to the sub groups according to the address information of the representative node device belonging to the sub groups;

wherein the content specifying unit specifies content data in the charge scope indicated by the charge scope information among the content data searched with the content catalog information related to the update received by the second receiving unit; and wherein the memory unit memorizes content catalog information for searching the content data specified by the content specifying unit.

11. A non-transitory computer-readable storage medium that stores a computer-executable program causing a processor included in a node device in an information communication system that includes a plurality of node devices which are mutually communicable through a network, a plurality of content catalogue information being dispersed and stored in the plurality of the node devices in the information communication system, the content catalogue information being for searching content data, and the content data being able to be acquired in the information communications system, to perform steps comprising:

memorizing at least a part of the plurality of the content catalogue information, the part of the plurality of the content catalogue information being content catalogue information of a charge scope of the node device;

memorizing charge scope information indicative of a digit-number of the node identification information corresponding to the node device comprising the memory unit, the digit-number corresponding to the charge scope of the node device, and the digit-number which becomes smaller as the charge scope becomes large;

sending to at least any one of one of the plurality of node devices search request information including search conditions for searching content catalogue information;

receiving the search request information being sent from another node device;

determining whether the content catalogue information requested in the search request information received is memorized; and sending, in response to determining the content catalogue information requested in the received search request information is memorized, the content catalogue information requested in the search request information to the another node device that sent the search request information;

wherein, in the information communication system, the content data corresponds to content identification information being unique identification information and the node devices included in the information communication system correspond to node identification information, wherein, in the memorizing step of the content catalogue information, as the content catalogue information of the charge scope of the node device which memorizes the part of the plurality of the content catalogue information, the content catalogue information for searching the content data corresponding to the content identification information of which predetermined digits match those of the node identification information corresponding to the node device which memorizes the part of the plurality of the content catalogue information is memorized, wherein, in the node device, address information of a representative node device is memorized, the address information indicating an address of another node device connected to the node device, and wherein the representative node device is at least one of the node devices of which the address information is memorized, wherein, in the memorizing step of the content catalogue information, the content catalog information for searching the content data corresponding to the content identification information of which a value of the number of digits matches the value of the number of digits of the node identification information corresponding to the node device which memorizes the part of the plurality of the content catalogue information is memorized, and wherein, in the sending step of the search request information, the search request information is sent to the representative node device in accordance with the address information of the representative node device, the value of the address information of the representative node device corresponding to a value different from the value of the digits of the matching digit-number indicated by the charge scope information.

12. A information communication system comprising a plurality of node devices comprising a processor and mutually communicable through a network, a plurality of content catalogue information being dispersed and stored in the plurality of the node devices in the information communication system, the content catalogue information being for searching content data, and the content data being able to be acquired in the information communication system, wherein the node device comprising:

a memory unit which memorizes at least a part of the plurality of the content catalogue information, the part of the plurality of the content catalogue information being content catalogue information of a charge scope of the node device comprising the memory unit;

a first sending unit which sends to at least any one of the plurality of the node devices search request information including search conditions for searching content catalogue information;

a first receiving unit which receives the search request information sent by the first sending unit included in another node device;

a determining unit which determines whether the content catalogue information requested in the search request information received by the first receiving unit is memorized in the memory unit; and a second sending unit which sends, in response to determining the content catalogue information requested in the search request information received by the first receiving unit is memorized in the memory unit, the content catalogue information requested in the search request information to the another node device that sent the search request information;

wherein, in the information communication system, the content data corresponds to content identification information being unique identification information and the node devices included in the information communication system correspond to node identification information, wherein the memory unit memorizes, as the content catalogue information of the charge scope of the node device comprising the memory unit, the content catalogue information for searching the content data corresponding to the content identification information of which predetermined digits match those of the node identification information corresponding to the node device comprising the memory unit, wherein, in the node device, address information of a representative node device is memorized, the address information indicating an address of another node device connected to the node device, and wherein the representative node device is at least one of the node devices of which the address information is memorized, and the node device further comprising:

a charge scope information memory unit which memorizes charge scope information indicative of a digit-number of the node identification information corresponding to the node device comprising the memory unit, the digit-number corresponding to the charge scope of the node device, and the digit-number which becomes smaller as the charge scope becomes large;

wherein the memory unit memorizes the content catalog information for searching the content data corresponding to the content identification information of which a value of the number of digits matches the value of the number of digits of the node identification information corresponding to the node device comprising the memory unit, and wherein the first sending unit sends the search request information to the representative node device in accordance with the address information of the representative node device, the value of the address information of the representative node device corresponding to a value different from the value of the digits of the matching digit-number indicated by the charge scope information.

13. A content catalog information search method in an information communication system including a plurality of node devices which are mutually communicable through a network, a plurality of content catalogue information being dispersed and stored in the plurality of the node devices in the information communication system, the content catalogue information being for searching content data, the content data being able to be acquired in the information communication system, the node devices comprising a memory unit which memorizes at least a part of the plurality of the content catalogue information, and the part of the plurality of the content catalogue information being content catalogue information of a charge scope of the node device comprising the memory unit, the content catalogue information search method comprising:

sending to at least any one of the plurality of the node devices search request information including search conditions for searching content catalog information;

receiving the search request information being sent from another node device;

determining whether the content catalogue information requested in the search request information received is memorized; and sending, in response to determining the content catalogue information requested in the received search request information is memorized, the content catalogue information requested in the search request information to the another node device that sent the search request information;

wherein, in the information communication system, the content data corresponds to content identification information being unique identification information and the node devices included in the information communication system correspond to node identification information, wherein the memory unit memorizes, as the content catalogue information of the charge scope of the node device comprising the memory unit, the content catalogue information for searching the content data corresponding to the content identification information of which predetermined digits match those of the node identification information corresponding to the node device comprising the memory unit, wherein, in the node device, address information of a representative node device is memorized, the address information indicating an address of another node device connected to the node device, wherein the representative node device is at least one of the node devices of which the address information is memorized, wherein the node device further comprising a charge scope information memory unit which memorizes charge scope information indicative of a digit-number of the node identification information corresponding to the node device comprising the memory unit, the digit-number corresponding to the charge scope of the node device, and the digit-number which becomes smaller as the charge scope becomes large, wherein the memory unit memorizes the content catalog information for searching the content data corresponding to the content identification information of which a value of the number of digits matches the value of the number of digits of the node identification information corresponding to the node device comprising the memory unit, and wherein, in the sending of the search request information, the search request information is sent to the representative node device in accordance with the address information of the representative node device, the value of the address information of the representative node device corresponding to a value different from the value of the digits of the matching digit-number indicated by the charge scope information.

14. The node device according to claim 6, wherein the second receiving unit receives the content catalog information returned from the node devices belonging to the sub groups to which the search request information is transferred, and wherein the second sending unit sends the content catalog information acquired by the content catalog information acquisition unit and the content catalog information received by the second receiving unit to the node device sending the search request information.

15. The node device according to claim 9, wherein in the content catalog information, an updated difference content catalog information is sent every time when the content catalog information memorized in the other node device is updated;

wherein the second receiving unit receives the content catalog information related to the update, which is sent from the other node device;

wherein the content catalog information sending unit sends the received content catalog information related to the update to the representative node device belonging to the sub groups according to the address information of the representative node device belonging to the sub groups;

wherein the content specifying unit specifies content data in the charge scope indicated by the charge scope information among the content data searched with the content catalog information related to the update received by the second receiving unit; and wherein the memory unit memorizes content catalog information for searching the content data specified by the content specifying unit.

* * * * *